United States Patent [19]
Csipkes et al.

[11] Patent Number: 5,768,401
[45] Date of Patent: Jun. 16, 1998

[54] BALANCED FOCUS SYSTEM AND METHOD FOR ACHIEVING OPTIMAL FOCUS OF DIFFERENT AREAS OF AN OBJECT THAT ARE CONCURRENTLY IMAGED

[75] Inventors: Andrei Csipkes, Lawrenceville; John Mark Palmquist, Lilburn, both of Ga.

[73] Assignee: Lucent Technologies Inc., Murray Hill, N.J.

[21] Appl. No.: 510,219

[22] Filed: Aug. 2, 1995

[51] Int. Cl.$^6$ ........................................... G06K 9/36
[52] U.S. Cl. ........................................ 382/255; 382/284
[58] Field of Search ............................... 382/108, 141, 382/148, 255, 284; 348/95, 218, 345, 349; 356/4.03, 4.04, 4.05, 125, 127

[56] References Cited

U.S. PATENT DOCUMENTS

| | | | |
|---|---|---|---|
| 4,738,507 | 4/1988 | Palmquist | 350/96.21 |
| 4,738,508 | 4/1988 | Palmquist | 350/96.21 |
| 4,787,698 | 11/1988 | Lyons et al. | 350/96.2 |
| 4,825,092 | 4/1989 | Mehadji | 250/561 |
| 5,471,310 | 11/1995 | Spigarelli et al. | 356/399 |
| 5,647,025 | 7/1997 | Frost et al. | 382/255 |

OTHER PUBLICATIONS

Norland, Eric A., "Defining and Measuring Physical Parameters of PC Polished Connectors," The 10th Annual National Fiber Optic Engineers Conference, San Diego, CA, Jun. 12–16, 1994, pp. 259–265.

Harding, Kevin et al., "Light Engineering for Machine Vision: Techniques and Applications," Part 1 and Part 2, Mar. 2–3, 1994, Ann Arbor, Michigan, Manufacturing Engineering Certification Institute sponsored by SME.

*Primary Examiner*—Andrew W. Johns

[57] ABSTRACT

A balanced focus system and method achieve optimal focus of different areas of an object that are concurrently imaged and then combined to form a combined image. The balanced focus method is particularly suited for, but not limited to, use with an automatic inspection system for contactlessly measuring at an endface of an optical fiber termination the eccentricity of an optical fiber core relative to a theoretical ideal center of an alignment surface of the termination. The inspection system has an imaging system with a feature imager and one or more boundary segment imagers but preferably four in number, a focus adjustment mechanism (FAM) for adjusting the position of the imagers relative to the imaged object along an optical axis, and a machine vision system for receiving image data from the foregoing imagers and configured to control the FAM. The feature imager is positioned to capture an image of the feature (e.g., fiber core endface), and the one or more boundary segment imagers are positioned to capture an image of a corresponding boundary segment of the object (e.g., termination endface). The machine vision system determines the eccentricity based upon the feature image and the one or more boundary segment images. Significantly, the machine vision system employs the balanced focus system and method to achieve an optimal focus position for the imaging system based upon a series of combined images and a statistic S that is computed for each of the sampling locations.

12 Claims, 19 Drawing Sheets

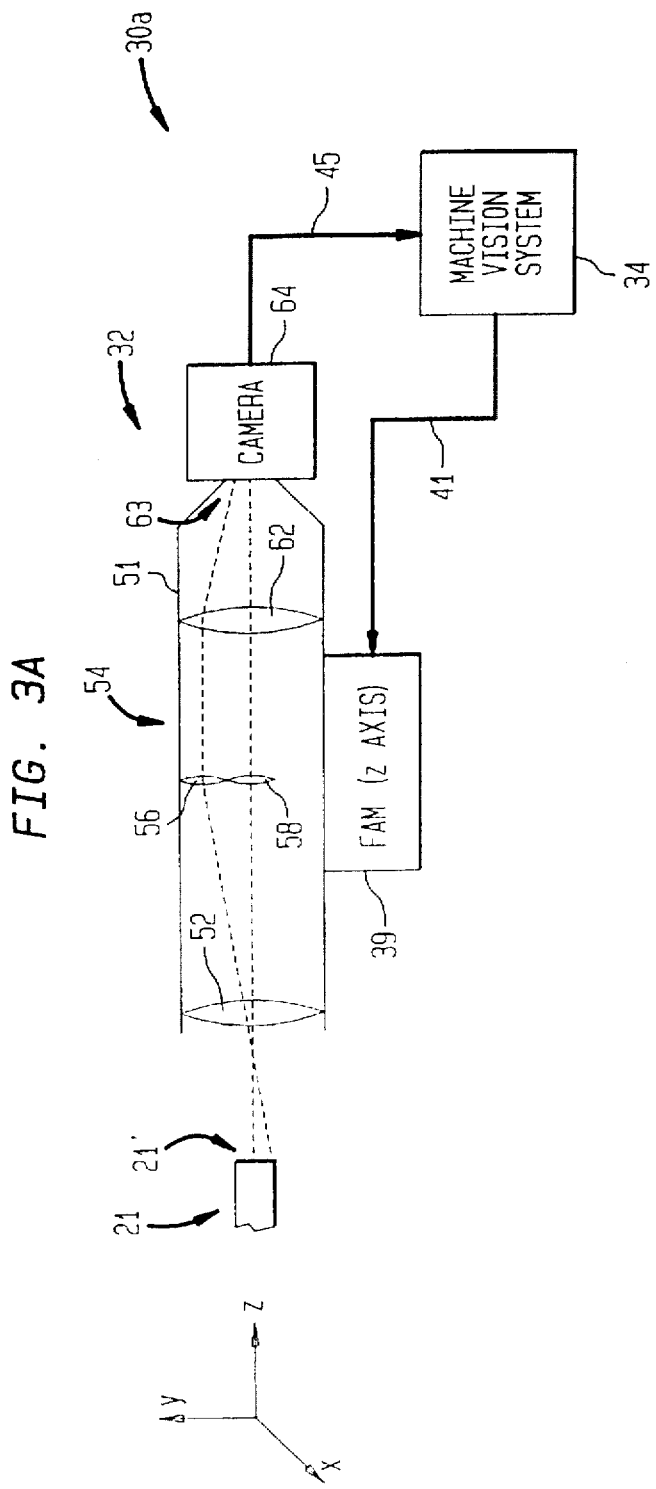

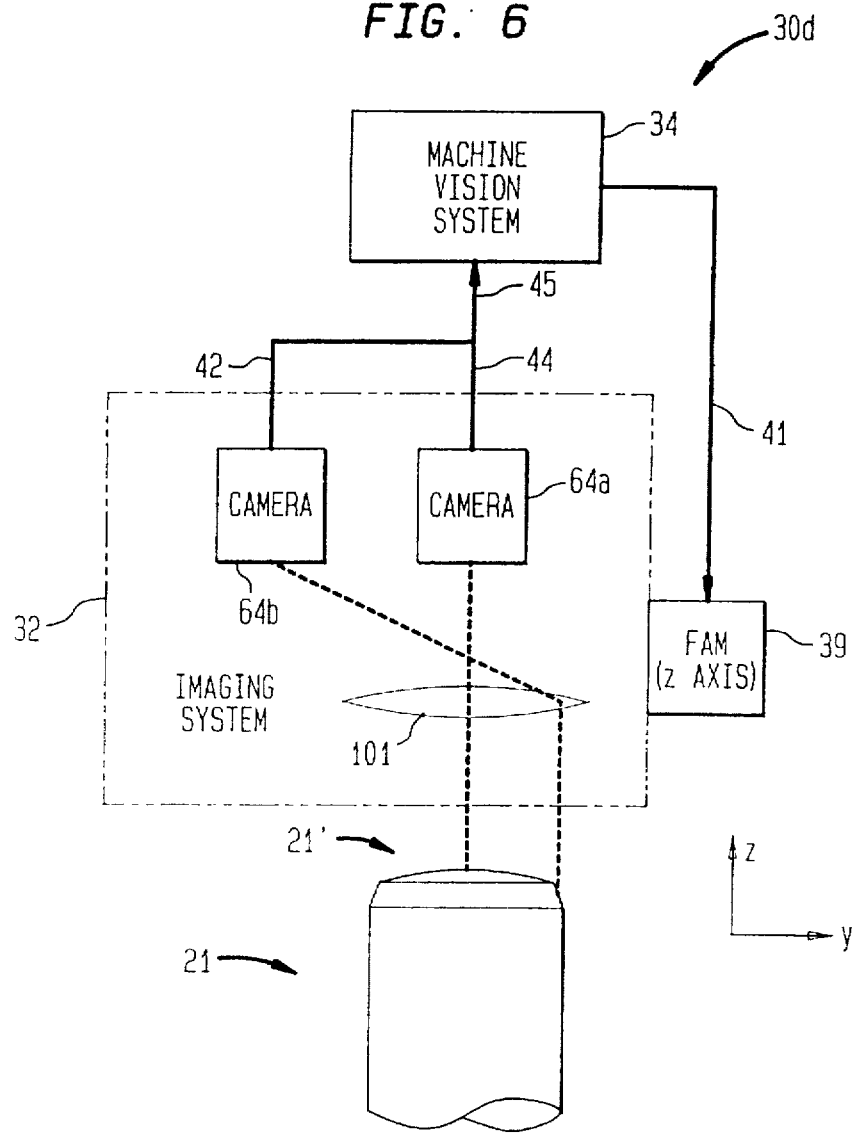

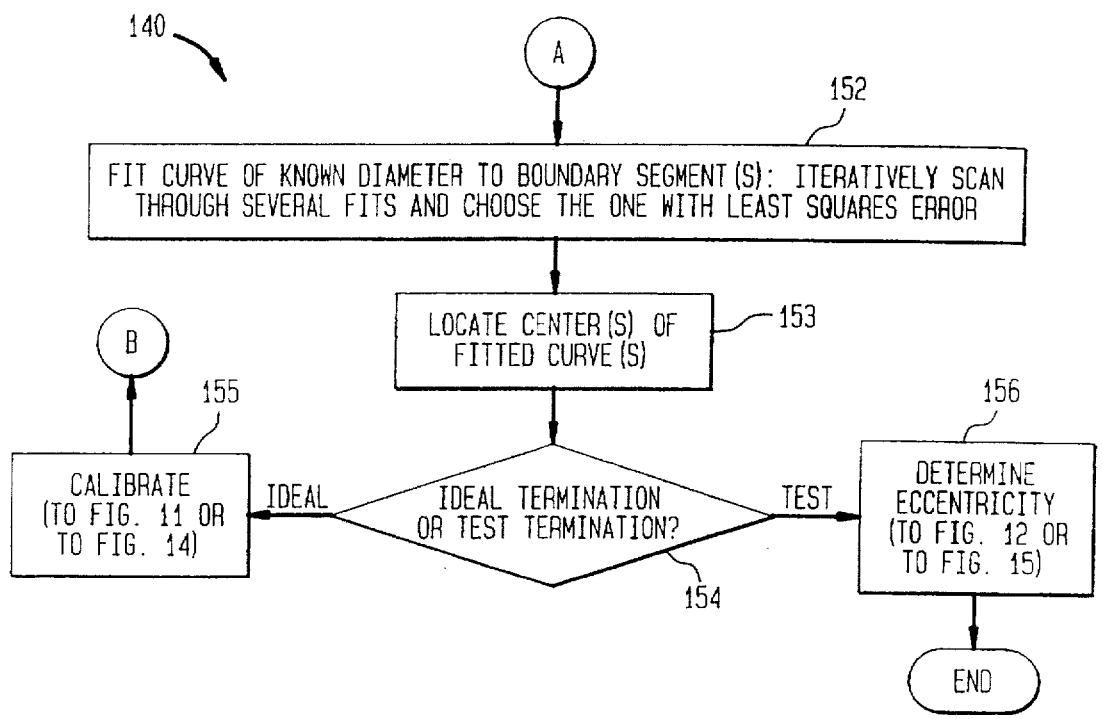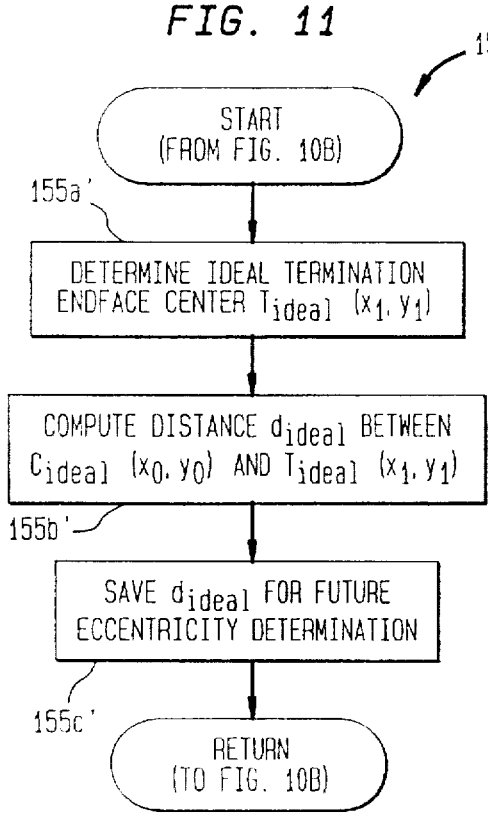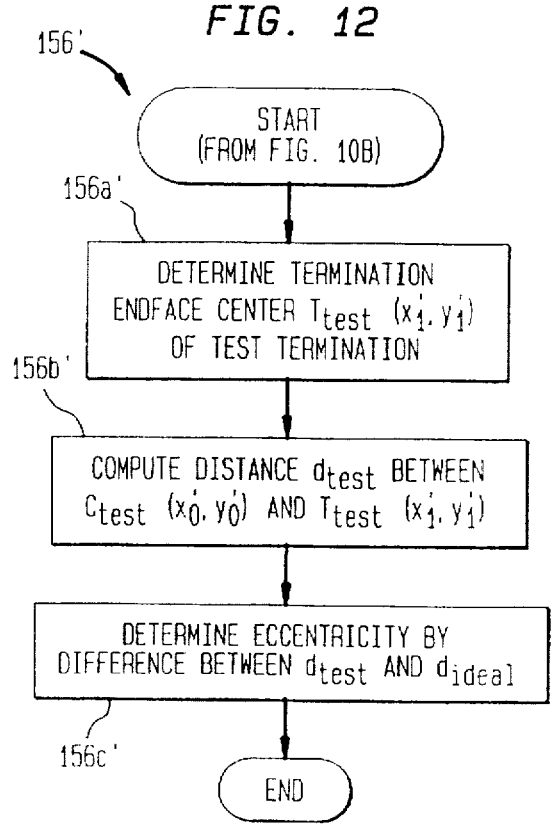

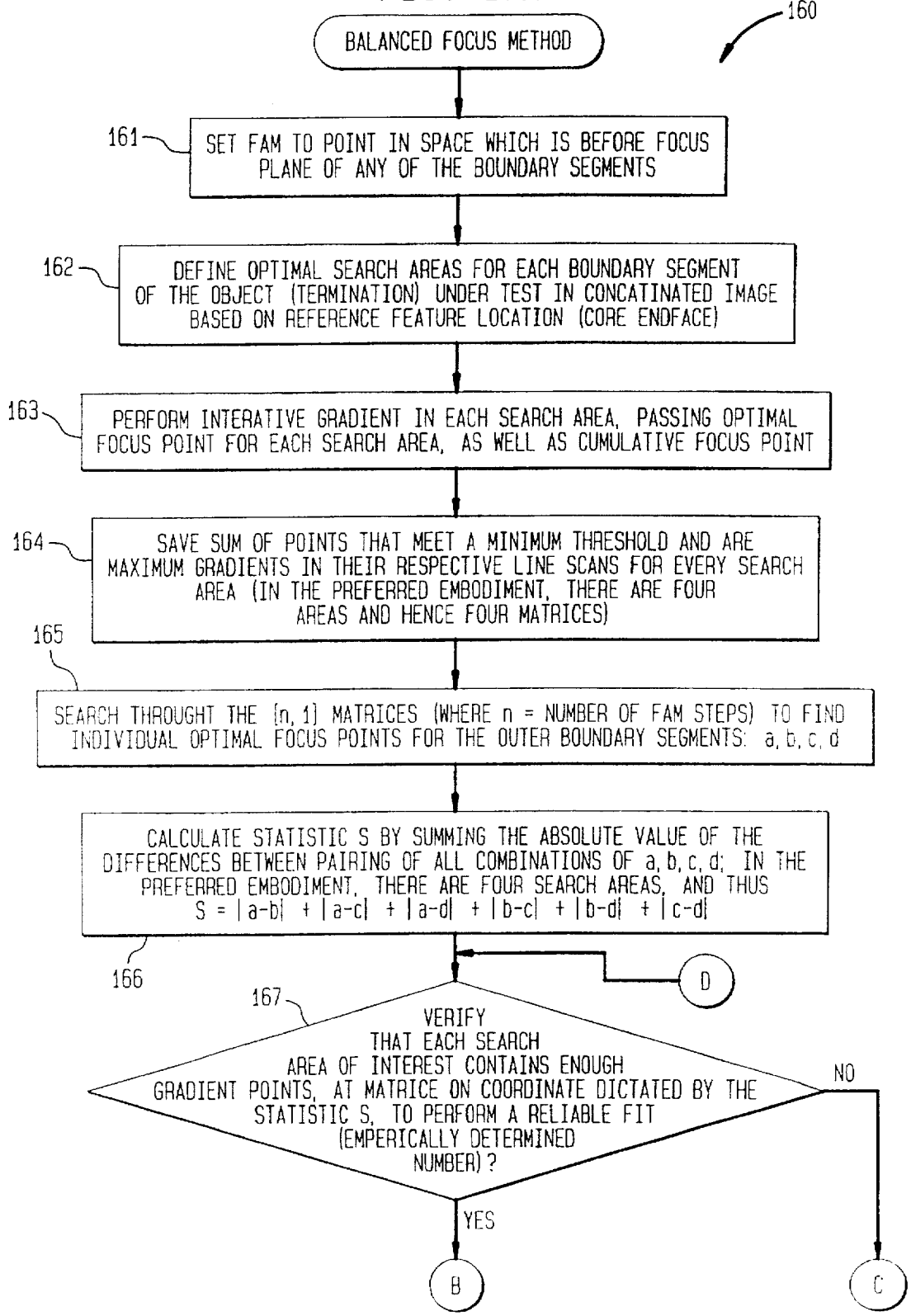

BALANCED FOCUS SYSTEM AND METHOD FOR ACHIEVING OPTIMAL FOCUS OF DIFFERENT AREAS OF AN OBJECT THAT ARE CONCURRENTLY IMAGED

FIELD OF THE INVENTION

The present invention generally relates to measurement, testing, and quality control systems, and more particularly, to a balanced focus system and method for achieving optimal focus of different areas of an object that are concurrently imaged and then combined to form a combined image. The balanced focus method is particularly suited for, but not limited to, use with an automatic inspection system for contactlessly measuring the degree of offset of a central feature of an object. An application of the automatic inspection system is measuring at an endface of an optical fiber termination the extent of offset, or eccentricity, of an optical fiber core relative to a theoretical ideal center of an alignment surface of the termination, where the core is extremely smaller in size than the alignment surface of the termination.

BACKGROUND OF THE INVENTION

An optical fiber cable used for communications includes an optical fiber. The optical fiber has a core that communicates light and cladding that surrounds and protects the core. The cladding is in turn covered with one or more coating, insulating, shielding, and/or support layers to complete the cable. Considering that a typical optical fiber core may measure only about 8 to 50 microns in diameter, the connection of two optical fiber cables so that their cores are precisely aligned is a formidable task.

In order to establish such a precise connection between optical fibers to be coupled, several different connection configurations have been developed in the art. One known configuration for establishing a connection between optical fibers is referred to as a ferrule connection. An example of a ferrule connection is shown and described in both U.S. Pat. No. 4,738,508 to Palmquist and U.S. Pat. No. 4,738,507 to Palmquist. Another known configuration is referred to as a biconic connection. An example of a biconic connection is shown and described in U.S. Pat. No. 4,787,698 to Lyons et al.

In both of the aforementioned connection configurations, the ends of the optical fiber cables to be joined are terminated, and the terminations are provided with a surrounding support material, or plug. To enable optimal performance and minimize light energy losses and reflections, the termination endfaces of the separate optical fiber terminations should be coupled so that the cores of the respective endfaces are precisely aligned. To achieve this end, the termination endfaces are joined by a coupling structure, which engages and aligns respective alignment surfaces on the corresponding termination plugs. In the case of a ferrule termination, the alignment surface is a generally cylindrical outermost boundary surface of the plug, which measures about 2500 microns in diameter. Moreover, in the case of a biconic termination, the alignment surface is a bevelled chamfer with an endface measuring about 4400 microns.

Successful assembly of a fiber termination for one of the aforementioned connections requires that the endface of the core be disposed very close to the center of the termination endface. The core endface (about 8 to 50 microns in diameter) is much smaller in diameter than the termination alignment surface (about 2500 microns in the case of a ferrule termination and about 4400 microns in the case of a biconic termination). Moreover, the offset, or eccentricity, of the core relative to the alignment surface should not exceed a micron on each of the two mating terminations. To achieve the foregoing precision, it is desirable to measure the eccentricity within a precision of about 0.1 micron. Several known prior art methods for measuring the eccentricity are described hereafter.

A first method involves digitizing points on the boundary of the core endface and of the termination endface by moving the termination endface relative to a toolmaker's microscope with the termination axis disposed parallel to the viewing axis of the toolmaker's microscope. Mathematical equations are then fitted to the digitized points in order to determine the centers of the core and termination. The distance between these two center points is defined as the eccentricity.

A second method of measuring the eccentricity involves viewing the core under a high power microscope, while the termination is rotated in a fixture, such as a V-shaped support block. The movement of the core is measured as the termination is rotated about its longitudinal axis. The locus of points defining the center of the core is, in general, circular as the termination is rotated, and the radius of the circle is equal to the eccentricity. The aforementioned technique is described in more detail in U.S. Pat. No. 4,787,698 to Lyons et al., relative to a biconic connection, and in U.S. Pat. No. 4,738,508 to Palmquist, relative to a ferrule connection.

A third method of measuring the eccentricity focuses upon measuring the effect of eccentricity and involves interconnecting the termination under test to a reference connector, sometimes referred to as a "golden connector," that is known to have negligible eccentricity. After establishing the connection with a coupling structure, the light transmission therethrough is measured. The eccentricity is determined based upon the loss of light and one or more mathematical equations that define the light loss as a function of the eccentricity.

A fourth method, which is basically obvious but has not been demonstrated successfully to date for reasons set forth hereafter, involves obtaining an image of the entire termination endface and fitting points to the boundaries of the core and termination. After generating the foregoing image, the offset can then be directly computed using known mathematical techniques. For instance, the offset can be determined by first fitting circles to the boundary pixels and core pixels, respectively, then determining the circle centers, and finally, the offset can be calculated as the displacement between the circle centers.

However, at present, the foregoing method cannot be practically implemented because of the extreme disparity in size between the core endface (about 8 microns in diameter) and the termination endface (2500 microns in diameter). Unfortunately, conventional machine vision systems have a standard resolution of typically 512×512 picture elements (pixels) and thus would have inadequate resolution to precisely locate the core with the desired resolution. More specifically, with the termination endface measuring 2500 microns in diameter, each pixel would represent about 5 microns. The core, with a diameter of for instance about 8 microns, would span only 1 to 2 pixels, and consequently, the process of locating the core to the requisite precision of 0.1 micron would be impossible. Locating the termination to a precision of 0.1 micron would require a subpixel resolution of about ⅟₅₀th of a pixel, which is generally not considered to be a routinely achievable practice in the machine vision art. Moreover, if an image of the termination endface is magnified to the extent that the core represents an adequate number of pixels, the termination boundary would no longer be present in the image and its position cannot be ascertained with accuracy. Furthermore, to further complicate imaging, the termination boundary and core boundary are not generally coplanar.

Hence, a heretofore unaddressed need exists in the industry for a system of contactlessly measuring the eccentricity of an optical fiber termination that is accurate within at least 0.1 micron, is less labor intensive, less material intensive, and less expensive than presently known systems. More particularly, a system is needed for contactlessly measuring the eccentricity of an optical fiber termination to a precision of at least 0.1 micron without the requirement of moving the termination on a coordinate measuring system such as a toolmaker's microscope, without the requirement of rotating the termination about its longitudinal axis to observe relative core movement, and without the requirement of connecting the termination to a transmission measurement test set in order to measure the light loss caused by misalignment.

SUMMARY OF THE INVENTION

The present invention provides a balanced focus system and method for achieving optimal focus of different areas of an object that are concurrently imaged and then combined to form a combined image. The balanced focus method is particularly suited for, but not limited to, use with an automatic inspection system for contactlessly measuring the degree of offset of a central feature of an object. An application of the automatic inspection system is measuring at an endface of an optical fiber termination the extent of offset or eccentricity, of an optical fiber core relative to a theoretical ideal center of an alignment surface of the termination, where the core is extremely smaller in size than the alignment surface of the termination. In this context, it should be noted that the core is extremely smaller (typically between about 50 and 300 times for a ferrule termination and about 80 and 550 times for a biconic termination) in size than the alignment surface of the termination.

The inspection system generally comprises (a) an imaging system with a feature imager and one or more boundary segment imagers but preferably four in number and (b) a machine vision system connected to the foregoing imagers of the imaging system. The feature imager is positioned to capture an image (feature image) of the feature (e.g., fiber core), and the one or more boundary segment imagers are positioned to capture an image of a boundary segment of the object (e.g., a termination endface). In the case where the object is a termination, the feature is the core and the boundary segment is the endface boundary of the alignment surface, which is a generally cylindrical outermost boundary surface of the plug in the case of a ferrule termination and which is a bevelled chamfer in the case of a biconic termination. Finally, the machine vision system determines the offset (e.g., eccentricity in the case of a termination endface) based upon the feature image and the one or more boundary segment images.

Preferably, the feature imager and each boundary segment imager comprise a respective lens. Each boundary segment lens is situated in a first plane and the feature lens is situated in a second plane that is substantially parallel to the first plane. Moreover, the first and second planes are separated by a distance that corresponds to a longitudinal spacing between the feature and the boundary of the object. Furthermore, a camera, for example, a charge couple device (CCD), is situated adjacent the lenses to simultaneously receive a multiplicity of images that are produced from the feature and boundary segment lenses, to thereby form a combined image. Finally, in the preferred embodiment, an objective lens and a collector lens are disposed on either side of the imager lenses so that each of the boundary segment lenses inverts and folds inwardly its respective boundary segment, while the feature lens passes its image in an noninverted state to the camera.

The machine vision system of the inspection system employs and is driven by an inspection method, which computes the degree of offset of the feature of the object under test from the theoretical ideal center $C_{ideal}$ of the object. The inspection method can be broadly summarized as follows. The termination endface is exposed to the boundary segment imager(s) and the feature imager of the imaging system. The boundary segment imager(s) produces a boundary segment image that is representative of a boundary segment of the alignment surface. Moreover, the feature imager generates a feature image that is representative of the feature of interest. In the preferred embodiment, the images are combined into a single combined image, and an electrical signal indicative of the combined image is passed onto the machine vision system for analysis. Alternatively, each of the imagers may generate a separate electrical signal representative of its respective area of interest, and the separate electrical signals are passed onto the machine vision system, where the electrical signals are used to construct the combined image in software or firmware for analysis.

From the combined image, the machine vision system determines the offset, or eccentricity, of the feature relative to the alignment surface as follows. A curve (e.g., a circle of known diameter) is fitted to each boundary segment captured by each boundary segment imager 36. A termination endface center $T_{test}$ is mathematically identified based upon the one or more fitted curves. Generally, the more curves that are utilized, the more accurate will be the determination of the theoretical termination endface center $T_{test}$. In the preferred embodiment, there are four boundary segment imagers and as a result, there are four circles fitted to the alignment surface. Moreover, the actual core endface center $C_{test}$ of the object under test is determined using any appropriate analysis of the combined image, for example but not limited to, gradient analysis.

The eccentricity is determined using one of two embodiments (first embodiment of calibration and eccentricity determination of FIGS. 11–13; second embodiment of calibration and eccentricity determination of FIGS. 14–16) that are described in detail later in this document. In the first embodiment, an eccentricity vector e is determined by comparing a distance vector $d_{test}$ (vectors are indicated in bold herein; $d_{test}$ has a magnitude and a direction) with a distance vector $d_{ideal}$. The distance vector $d_{test}$ represents the displacement between the core endface center $C_{test}$ and the termination endface center $T_{test}$, both corresponding with a test termination. The distance vector $d_{ideal}$ represents the displacement between an ideal core endface center $C_{ideal}$ and an ideal termination endface center $T_{ideal}$, both corresponding with an ideal termination (i.e., characterized by de minimis eccentricity) and stored during initialization of the inspection system. The magnitude of the eccentricity vector e is the desired eccentricity value, and the angle of the eccentricity vector e reflects the angle of the eccentricity.

In the second embodiment (best mode), the eccentricity is determined first by drawing radial lines outwardly from the core endface center $C_{test}$ and positioning each fitted circle center on a respective radial line. Further, the intercept points where the radial lines intersect the fitted circles are identified and compared to ideal intercept points corresponding to an ideal termination endface center $T_{idea}$. A transformation map (lookup table or equation) having the ideal intercept points is generated during initialization of the inspection system, and the ideal intercept points are retrieved in operation based upon the core endface center $C_{test}$. Finally, the eccentricity is determined by comparing the ideal intercept points with the actual intercept points.

When more than one boundary segment imager is utilized, the machine vision system may employ the balanced focus method for achieving optimal focus of the different boundary segments of the object when the combined image is formed. The balanced focus method is incorporated into the inspection method and comprises the following steps: (a) generating a series of combined images by the following steps: (1) moving the objective incrementally along an axis (z axis herein) relative to the object; (2) capturing concurrently respective images of the different areas of the object with the optical system when the objective resides at various sampling locations along the axis; and (3) combining the respective images corresponding with particular sampling locations of the objective so that the respective images appear as portions of each of the combined images; and (b) determining an optimal focus position for the optical system along the axis (z axis herein) based upon the series of the combined images.

Furthermore, the step (b) in the balanced focus method can be accomplished by the following steps: (1) defining search areas in each of the combined images that encompass and correspond with the image areas; (2) identifying pixel locations in each of the search areas that exhibit a maximum gradient and that exceed a predetermined threshold; (3) determining a number of pixel locations that are identified for each of the search areas to produce pixel sums corresponding to the search areas respectively; (4) computing a statistic S for each of the sampling locations by mathematically combining the pixel sums; and (5) determining an optimal sampling location for the objective based upon a local minimum of the statistic S.

The novel balanced focus system and method of the present invention have many advantages, a few examples of which are set forth hereafter.

Another advantage of the balanced focus system and method is that they enable accurate measurement of an offset of a central feature of the object with a very high precision of typically less than 0.1 micron.

Another advantage of the balanced focus system and method is that they enable in-focus imaging of an object feature and a boundary segment of the object in a single image, even though the feature and segment are not in the same focal plan. This feature is particularly useful when determining the eccentricity of an optical fiber core at the endface of a ferrule termination, because the ferrule termination has a bevelled chamfer with a core and boundary segments residing in different focal planes.

Another advantage of the balanced focus system and method is that they enable implementation of a very accurate automatic inspection system for measuring the eccentricity of an optical fiber core at a termination (e.g., ferrule type or biconic type).

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, in the figures, like reference numerals designate corresponding parts throughout the several views.

FIG. 3A is a block diagram illustrating a first embodiment of the inspection system of FIG. 2;

FIG. 6 is a block diagram illustrating a fourth embodiment of the inspection system of FIG. 2;

FIG. 9A shows a combined image derived from a core image and an inverted boundary segment image; FIG. 9B shows a combined image derived from a core image and a noninverted boundary segment image; FIG. 9C shows a combined image (best mode) derived from a core image and four inverted boundary equally-spaced segment images; and FIG. 9D shows a combined image derived from a core image and four noninverted equally-spaced boundary segment images;

FIGS. 10A and 10B show a flow chart illustrating an inspection method of the present invention that is employed by and drives the machine vision system in the inspection system of FIG. 2;

FIGS. 11 and 12 show a first embodiment for calibration and eccentricity determination in the inspection method of FIGS. 10A and 10B; specifically, FIG. 11 shows a calibration method, and FIG. 12 shows a corresponding eccentricity determination method;

FIG. 14 shows a calibration method, and FIG. 15 shows a corresponding eccentricity determination method;

FIGS. 17A through 17C show a flow chart illustrating a balanced focus system and method of the present invention that can be utilized in conjunction with the inspection method of FIGS. 10A and 10B for optimizing the eccentricity computation.

DETAILED DESCRIPTION OF THE PREFERRED EMBODIMENTS

Figure 1A:
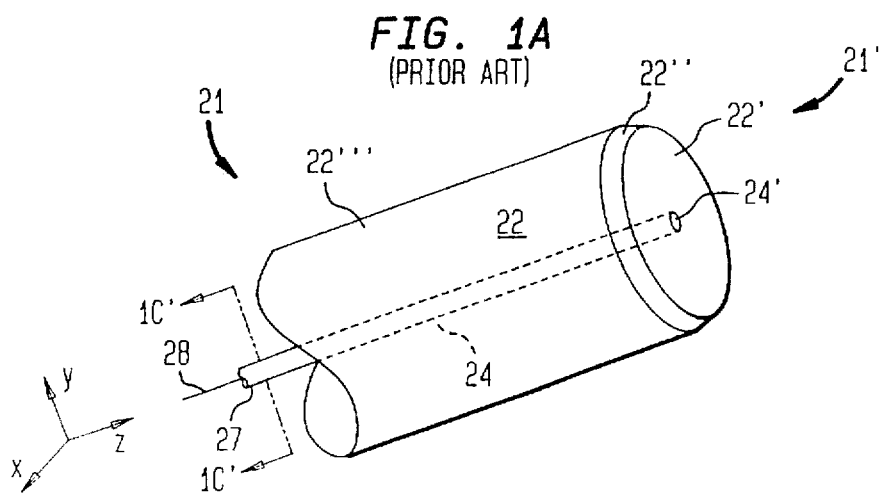
FIG. 1A is a perspective view of a conventional ferrule type optical fiber termination, as an example of an object to be analyzed in accordance with the present invention.
Figure 1B:
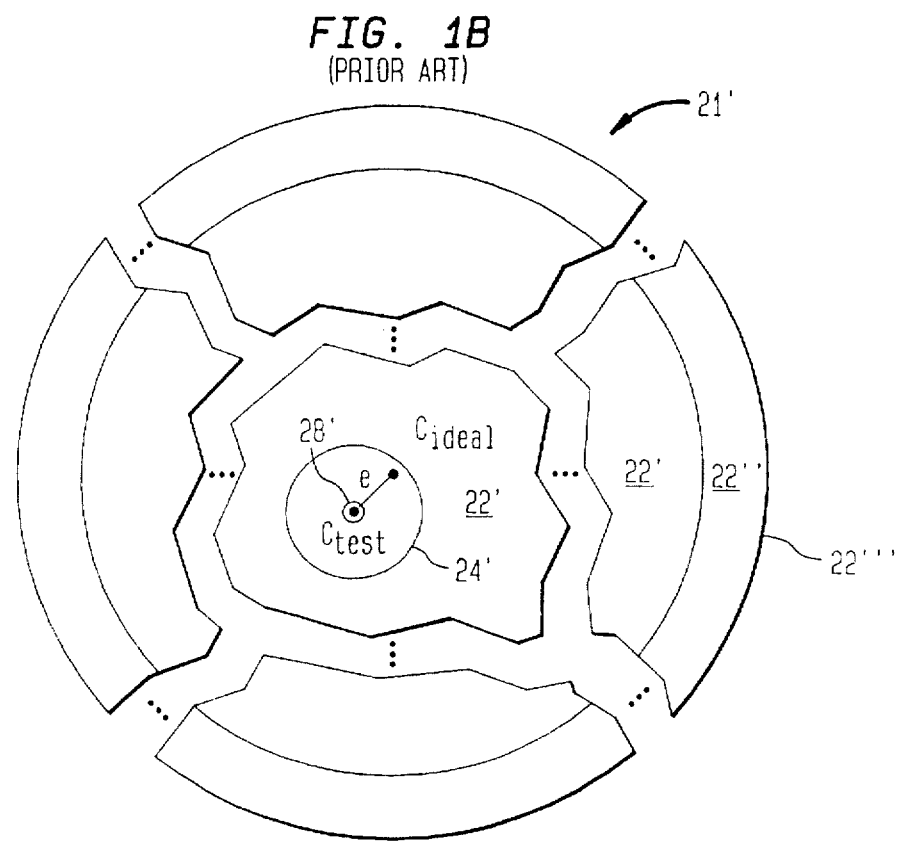
FIG. 1B is an endface view of the termination of FIG. 1A.

Although not limited to this particular application, the inspection system of the present invention is particularly suited for contactlessly and nondestructively measuring at an endface of an optical fiber termination the extent of offset, or eccentricity, of an optical fiber core relative to a center of the termination. In this application, the optical fiber core is extremely smaller (typically between about 50 and 300 times) in size than the outermost termination boundary. For the sake of clarity, an optical fiber termination for a ferrule connection is illustrated in the views of FIGS. 1A and 1B, and the inspection system will be described in the context of imaging the aforementioned specific type of termination. Note that the biconic termination that is described hereafter is disclosed in more detail in U.S. Pat. No. 4,738,508 to Palmquist and U.S. Pat. No. 4,738,507 to Palmquist. Further note that the inspection system may be used for determining the eccentricity of other types of terminations, including particularly the termination used in a biconic connection, as described in U.S. Pat. No. 4,787,698 to Lyons et al.

I. OPTICAL FIBER TERMINATION AND MEASUREMENT OF ECCENTRICITY

FIG. 1A illustrates a ferrule termination 21. The ferrule termination 21 includes a generally-cylindrical outer support layer, or plug, 22 surrounding a generally cylindrical internal optical fiber 24. An endface 21' of the termination 21 includes a plug endface 22' situated about an optical fiber endface 24'. The endfaces 22', 24' collectively form a generally continuous spherical curvature (typically a radius of about 18 mm) that is transverse to the longitudinal z axis of the fiber 24. The termination endface 21' further comprises a beveled chamfer 22" situated between the plug endface 22' and a cylindrical outermost plug boundary surface 22''', which will be referred to as an alignment surface because it is engaged and guided by a coupling structure in a connection to insure alignment of separate terminations 21. The beveled chamfer 22" is generally conically annular about and symmetric with respect to the elongated optical fiber 24. Further, the alignment surface 22''' measures typically about 2500 microns in the ferrule termination 21 of the preferred embodiment.

Figure 1C:
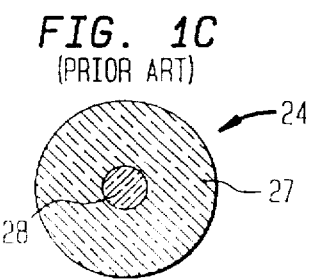
FIG. 1C is a cross sectional view of an optical fiber that is within the termination of FIG. 1A, showing a central optical fiber core and surrounding cladding.

The optical fiber 24 includes an outer elongated cladding layer 27 and an internal elongated cylindrical core 28 having a core endface 28', as illustrated in FIGS. 1B and 1C. The core generally measures approximately between 8 and 50 microns. Hence, the core is much smaller (typically between about 50 and 300 times for a ferrule termination and about 80 and 500 times for a biconic termination) than the alignment surface 22''' of the plug 22.

Figure 1D:
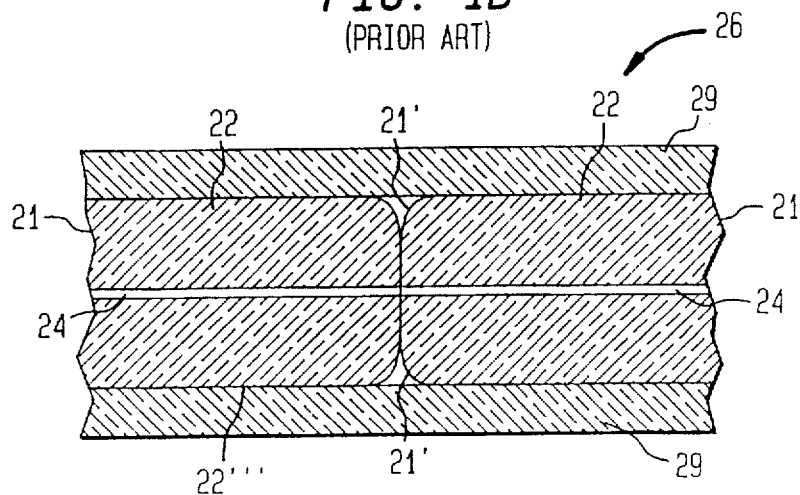
FIG. 1D is a cross sectional view of a coupling structure for connecting separate ferrule terminations of FIG. 1A and 1B.

In a connection of two separate terminations 21, to enable optimal performance and minimize light energy losses and reflections, the termination endfaces 21' of the separate terminations 21 should be coupled so that the cores endfaces 28' of the respective endfaces 21' are precisely aligned. To achieve this end, the termination endfaces 21' are joined by a coupling structure 26, shown in cross section in FIG. 1D, which engages and aligns respective alignment surfaces 22''' on the corresponding termination plugs. Usually, the coupling structure 26 comprises a generally cylindrical sleeve 29 or equivalent thereof. An example of a coupling structure 26 having the sleeve 29 is described in U.S. Pat. No. 4,738,508 to Palmquist. In the case of a ferrule termination, the termination has an outer alignment surface 22''' of about 2500 microns in diameter that is aligned and guided by the coupling structure 26.

In order to further insure proper alignment of the core endfaces 28' of terminations 21 in an optical fiber termination connection, the core endface 28' of each termination 21 should be disposed very close to the center of the termination endface 21'. The eccentricity of a termination is generally a measurement of the deviation of the core endface 28' from the center of the termination alignment surface. The concept of eccentricity is more fully described hereafter in relation to FIG. 1B. For purposes of clarity and understanding, the eccentricity associated with the termination 21 is visually exaggerated. Herein, the eccentricity is defined as the deviation or displacement of the core endface 28' corresponding to the test termination 21 and having center $C_{test}$ from the theoretical ideal center $C_{ideal}$ of the endface area defined by the alignment surface 22'''. As described previously, the eccentricity of the core endface 28' relative to the alignment surface 22''' should not exceed a micron on each of two mating terminations 21 in order to achieve optimal performance. To achieve the foregoing precision, it is desirable to measure the eccentricity within a precision of about 0.1 micron.

It should be noted that the determination of eccentricity in the ferrule termination is slightly different than the determination of eccentricity in the biconic termination. More specifically, in a biconic termination, the alignment surface is the bevelled chamfer itself, which is a much larger region than the bevelled chamfer in the ferrule termination, and the boundary of interest for determining eccentricity is the boundary where the plug endface meets the bevelled chamfer. Moreover, the diameter of the foregoing boundary is typically about 4400 microns.

II. AUTOMATIC INSPECTION SYSTEM

A. Architecture

Figure 2:
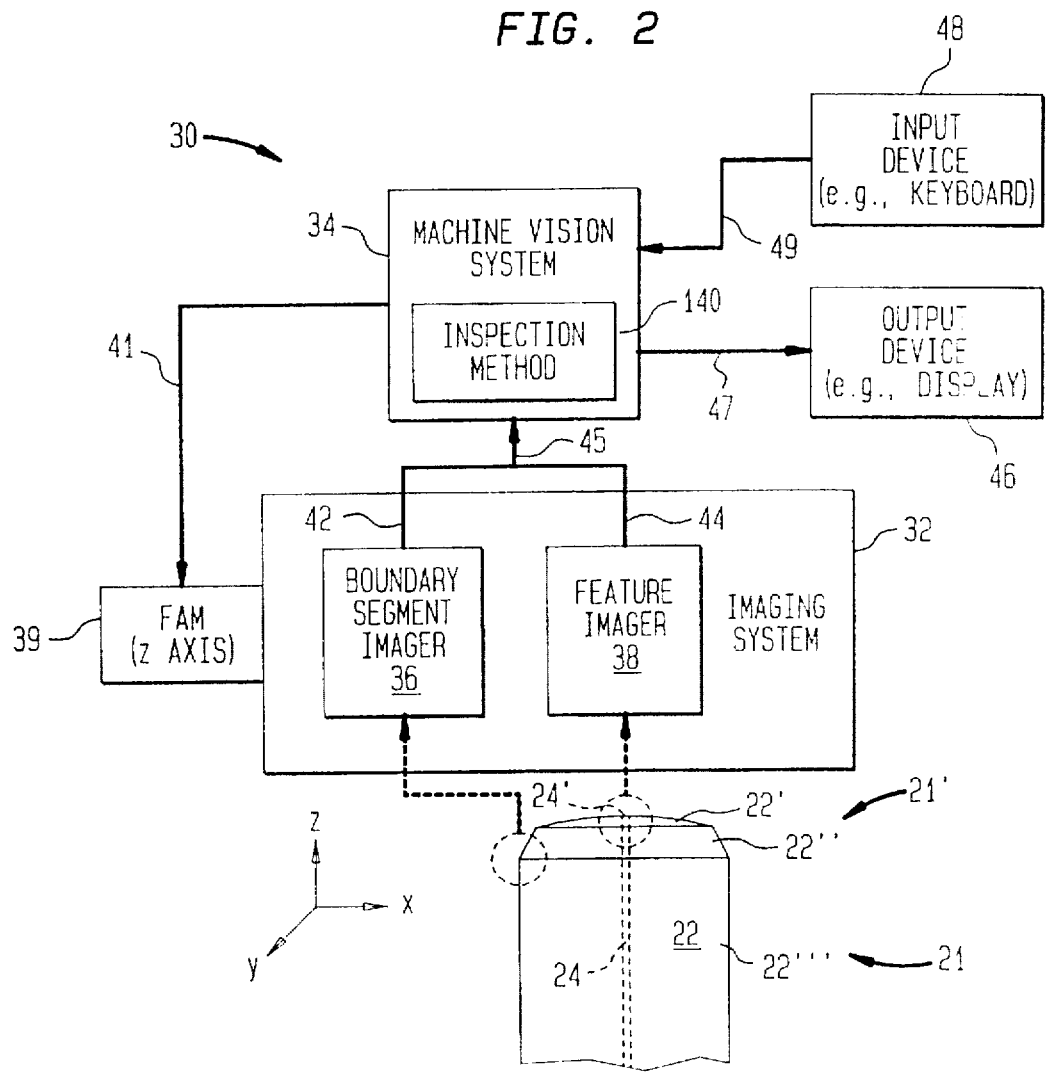
FIG. 2 is a block diagram illustrating the inspection system and method.

An automatic inspection system 30 in accordance with the present invention is illustrated by way of a block diagram in FIG. 2. The automatic inspection system 30 can be used to accurately determine an offset of a feature (e.g., fiber core) of an object (e.g., optical fiber termination) from the theoretical ideal center $C_{ideal}$ of the object without destruction of or contact with the object. It should be noted that the discussion hereafter relative to the inspection system 30 is also applicable to the specific implementations (i.e., inspection systems 30a, 30a', 30b, 30c, 30d) of the system 30 that are described later in this document.

In architecture, the inspection system 30 has an imaging system 32. The imaging system 32 has one or more boundary segment imagers 36 (preferably four spaced equidistant around the alignment surface 22'''; only one is shown in FIG. 2 and in the specific implementations merely for simplicity) and a feature imager 38. Each boundary segment imager 36 is configured to capture an image of a respective boundary segment of the alignment surface 22''', as indicated by phantom lines in FIG. 2. Moreover, the feature imager 38 is configured to capture an image of the feature at issue, which may exhibit an offset from the alignment surface 22'''. The imagers 36, 38 can be any suitable apparatus, conventional or custom made, for receiving an optical image as described and converting the optical image into an electrical signal for processing. Further, the imagers 36, 38 may share hardware, as will be further clear after the discussion of the specific implementations.

When the inspection system 30 is utilized to image a ferrule termination endface 21', it is desirable to recess (by approximately 0.5 mm) the feature imager 38 slightly behind the boundary segment imager 36 from the termination endface 21' so as to accommodate for the difference in focal plane between the feature (termination core) and the boundary segment(s) on the termination endface 21'. This configuration enables optimal focusing of the termination endface 21' and more accurate determination of the eccentricity.

A machine vision system 34 is interconnected with the optical system 32 for processing the aforementioned image information. The machine vision system 34 can be any suitable logic, processor, or computer that is conventional or custom made and that is configured to process the electrical signals 42, 44 from the respective imagers 36, 38. In the preferred embodiment, the machine vision system 34 executes and is driven by an inspection method 140 (FIGS. 10A–10B), preferably in the form of an executable software program.

The imaging system 32 is interconnected with and is selectively moved by an automatic focus adjustment mechanism (FAM) 39, which in turn is controlled by the machine vision system 34 as indicated by reference arrow 41. The FAM 39 is interfaced with the optical system 32 so that the imagers 36, 38 can be moved, individually or collectively, to or from the respective areas to be imaged on the termination endface 21' so as to focus in the respective areas for precise imaging and for precise analysis by the machine vision system 34.

Optionally, an output device 46 may be employed and connected to the machine vision system 34, as is indicated by the reference arrow 47. The output device 46 can be any suitable mechanism for supplying information to the user. For example, the output device 46 can be a conventional display or printer. Aside from receiving diagnostic and operational parameters and perhaps an initiation signal from the user, the inspection system 30 as well as the specific implementations thereof are fully automatic. In fact, the inspection systems as described herein can be set up to completely automatically communicate to another automated system.

An input device 48, which is also optional, can be any suitable mechanism for receiving prompts or information from the user and conveying the information to the machine vision system 34, as indicated by the reference arrow 49. As examples, the input device 48 can be a conventional computer keyboard, mouse, trackball, etc.

Depending upon the lighting conditions around the object under test, the object may need to be affirmatively illuminated with a light source. In the preferred embodiments, the optical fiber termination 21 is illuminated with any suitable light source so that images can be captured by the imagers 36, 38. Several lighting embodiments (e.g., FIG. 7B) will be described hereinafter.

The inspection system 30 may be mounted in a commercial scale optical fiber manufacturing facility or other facility for monitoring the quality control of optical fiber terminations 21. Moreover, the termination 21 under test can be disposed in view of the imaging system 32 by manual human manipulation or, alternatively, by an automated mechanism. As an example, the termination 21 could be situated upon a conveyor, along with perhaps many other terminations 21 situated in series, and moved in front of the imaging system 32 so that a measurement can be automatically made by the inspection system 30.

B. Operation

When the inspection system 30 is in operation, the termination endface 21' is exposed to the boundary segment imager(s) 36 and the feature imager 38 of the imaging system 32. The boundary segment imager(s) 36 produces a boundary segment image that is representative of a boundary segment of the alignment surface 22'''. Moreover, the feature imager 38 generates a feature image that is representative of the feature of interest. As indicated by reference numerals 42, 44, 45 in FIG. 2, in the preferred embodiment, the images are combined into a single combined image, and an electrical signal indicative of the combined image is passed onto the machine vision system 34 for analysis. Alternatively, each of the imagers 36, 38 may generate a separate electrical signal representative of its respective area of interest, and the separate electrical signals are passed onto the machine vision system 34, where the electrical signals are used to construct the combined image in software or firmware for analysis.

From the combined image, the machine vision system 34 determines the offset, or eccentricity, of the feature relative to the alignment surface 22''' as follows. A curve (e.g., a circle of known diameter) is fitted to each boundary segment captured by each boundary segment imager 36. A termination endface center $T_{test}$ is mathematically identified based upon the one or more fitted curves. Generally, the more curves that are utilized, the more accurate will be the determination of the theoretical termination endface center $T_{test}$. In the preferred embodiment, there are four boundary segment imagers 36 and as a result, there are four circles fitted to the alignment surface 22'''. Moreover, the actual core endface center $C_{test}$ of the object under test is determined using any appropriate analysis of the combined image, for example but not limited to, gradient analysis.

The eccentricity is determined using one of two embodiments (first embodiment of calibration and eccentricity determination of FIGS. 11–13; second embodiment of calibration and eccentricity determination of FIGS. 14–16) that are described in detail later in this document. In the first embodiment, an eccentricity vector e is determined by comparing a distance vector $d_{test}$ with a distance vector $d_{ideal}$. The distance vector $d_{test}$ represents the displacement between the core endface center $C_{test}$ and the termination endface center $T_{ideal}$, both corresponding with a test termination 21. The distance vector $d_{ideal}$ represents the displacement between an ideal core endface center $C_{ideal}$ and an ideal termination endface center $T_{ideal}$, both corresponding with an ideal termination 21 (i.e., characterized by de minimis eccentricity) and stored during initialization of the system 30. Further, a magnitude and angle for the eccentricity can be directly determined from the eccentricity vector e.

In the second embodiment (best mode), the eccentricity is determined first by drawing radial lines outwardly from the core endface center $C_{test}$ and positioning each fitted circle center on a respective radial line. Further, the intercept points where the radial lines intersect the fitted circles are identified and compared to ideal intercept points corresponding to an ideal termination endface center $T_{ideal}$. A transformation map (lookup table or equation) having the ideal intercept points is generated during initialization of the inspection system 30, and the ideal intercept points are retrieved in operation based upon the core endface center $C_{test}$. Finally, the eccentricity is determined by comparing the ideal intercept points with the actual intercept points.

C. First Embodiment Of The Inspection System

A first embodiment of the inspection system 30 is illustrated in FIG. 3A and is generally denoted by reference numeral 30a. Structurally, the inspection system 30a comprises an imaging system 32 having an elongated, preferably cylindrical, microscope 51, which is shown in cross section in FIG. 3A situated along a longitudinal z axis that is generally in line with the termination 21 (perpendicular to the termination endface 21').

The microscope 51 includes an objective 52 (one or more lenses or other optical elements) situated at a first end of the microscope 51 and adapted to capture images of the termination endface 21'. The microscope 51 further comprises an arrangement 54 of secondary lenses situated near the longitudinal midpoint of the microscope 51. The secondary lens arrangement 54 includes a boundary segment lens 56 situated near an internal periphery of the microscope 51 and a centrally-situated feature lens 58, which is disposed along the longitudinal axis of the microscope 51. The microscope 51 further includes a collector 62 (one or more lenses or other optical elements) positioned at a second end of the microscope 51 to receive images from the secondary lens arrangement 54 and to project a combined image through an opening 63 at the second end of the microscope 51. A "combined image" herein means a single image derived from the superimposition or combination of two or more other images via hardware, software, or combination thereof. The objective 52, the feature lens 58, and the collector 62 have their focal points positioned and substantially aligned along a common z axis, while the boundary segment lens 56 has its focal point positioned along another z axis that is parallel to the common z axis.

Because of the aforementioned lens arrangement in the microscope 51, the boundary segment appears inverted in the combined image, while the feature appears noninverted. In other words, the boundary segment image that is retrieved from the objective 52 is effectively folded inwardly toward the feature when the combined image is formed at the collector 62. Moreover, the feature image is received by the centrally-situated feature lens 58 from the objective 52 and passed in a noninverted state to the collector 62, so that the feature appears noninverted in the ultimate combined image.

A camera 64 is connected to the second end of the microscope 51 and is positioned to receive the combined image from the collector 62 through the opening 63. The camera 64 can be any suitable imaging device for converting an optical image into an electrical signal, but is preferably a charge-couple device (CCD). The CCD camera 64 comprises a pixel array for receiving light. Moreover, the pixel array encodes the image by generating analog voltage signals proportional to the intensity of light at each pixel of the CCD, as is well known in the art.

The machine vision system 34 receives the analog electrical signals that encode the combined image from the CCD camera 64, as is indicated by the reference arrow 45. As mentioned, the machine vision system can be implemented with any suitable logic, processor, computer, or a combination thereof.

The microscope 51 is mounted to the FAM 39. Under the control of the machine vision system 34 as indicated by reference arrow 41, the FAM 39 can move the microscope 51 along its longitudinal z axis so that the lens configuration within the microscope 51 is moved to or from the termination endface 21'. A suitable FAM 39 is a piezoelectric translator that can selectively move the microscope 51 a distance based upon a closed loop control signal of voltage.

1. Best Mode Embodiment Of The Invention

Figure 3B:
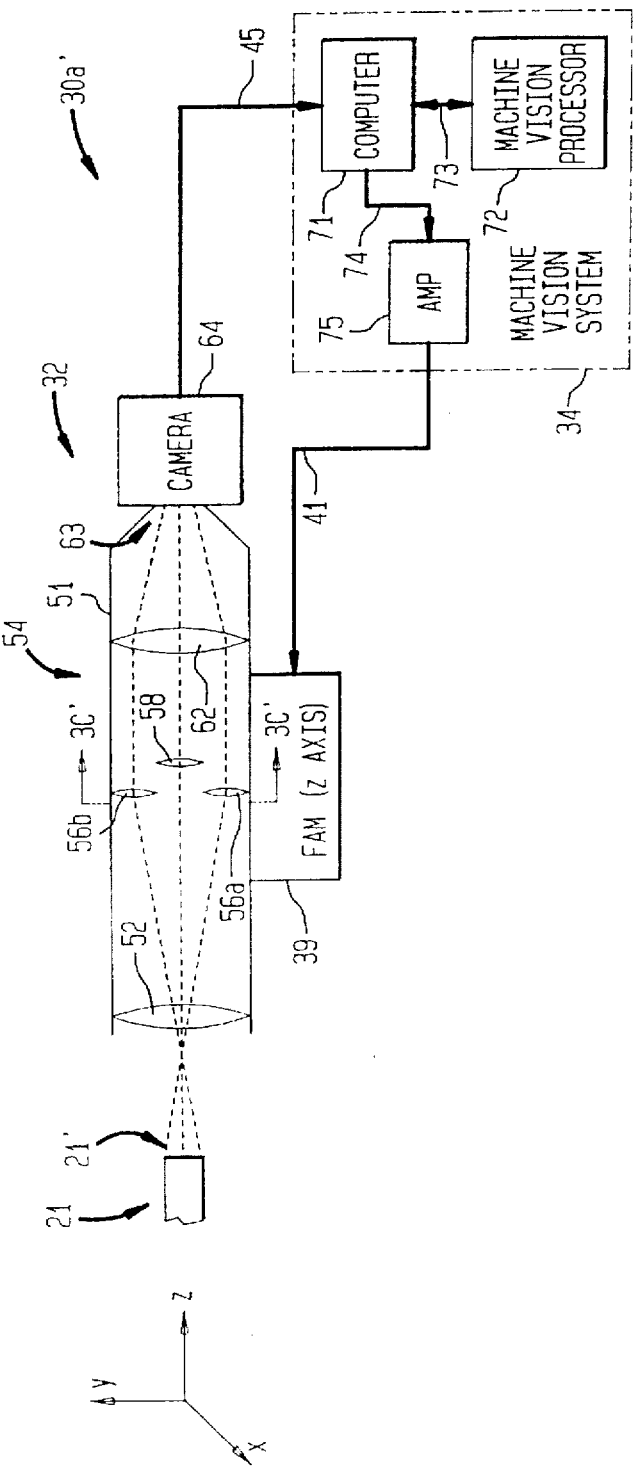
FIG. 3B is a block diagram of a best mode for practicing the first embodiment of FIG. 3A.

FIG. 3B illustrates the best mode embodiment for practicing the present invention and, particularly, the best mode embodiment for practicing the first embodiment (the inspection system 30a of FIG. 3A). The best mode embodiment is generally denoted by reference numeral 30a' in FIG. 3B.

In structure, the inspection system 30a' is constructed in generally the same manner as the inspection system 30a (FIG. 3A), with the exception of the secondary lens arrangement 54. Thus, the previous discussion relative to the system 30a, to the extent applicable, is incorporated herein by reference and directed to the system 30a' of FIG. 3B.

Figure 3C:
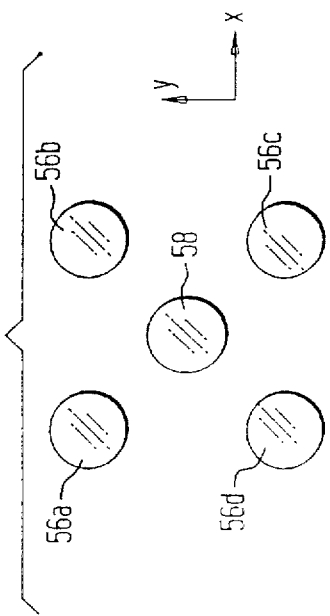
FIG. 3C is a front view of a novel lens configuration employed in the best mode embodiment of FIG. 3B taken along line 3C'—3C'.

With respect to the secondary lens arrangement 54 of the best mode embodiment of FIG. 3B, the arrangement 54 has four boundary segment lenses 56a–56d in a satellite configuration situated substantially equidistant around the centrally-situated feature lens 58 and along the internal periphery of the microscope 51. FIG. 3C is a front view of a novel lens configuration employed in the best mode embodiment of FIG. 3B taken along line 3C'—3C' of FIG. 3B. From FIG. 3C, it is apparent that the boundary segment lenses 56a–56d are spaced about 90 degrees apart about the central feature lens 58. Hence, in the best mode, four boundary segment imagers and a feature imager are implemented.

Furthermore, because the inspection system 30 is utilized to image a ferrule termination endface 21', it is desirable to recess (by approximately 0.5 mm) the feature lens 58 slightly behind the plane of the boundary segment lenses 56a–56d from the termination endface 21' so as to accommodate for the difference in focal plane between the termination core endface 28' and the alignment surface 22'" on the termination endface 21'. This configuration enables optimal focusing of the termination endface 21' and more accurate determination of the eccentricity.

In the best mode embodiment of FIG. 3B, the objective 52 and the secondary lenses 56a–56d, 58, and the collector 62 have an effective magnification of 30×. The camera 64 is a CCD, such as a model KP-M1, which is commercially available from Hitachi, Japan.

The FAM 39 is a model P721.00 piezoelectric translator, which is manufactured by Physik Instrumente, Germany. The foregoing piezoelectric translator can selectively move the microscope 51 a distance of about 100 microns (with a resolution of 3 about nanometers) based upon a closed loop control signal of voltage between about 0 and 100 volts. When 0 volts is supplied to the piezoelectric translator 72, the objective 52 is maintained at its greatest distance (is completely retracted) from its target along the z axis, whereas when 100 volts is supplied to the piezoelectric translator 72, the objective 52 is the closest distance (full extension) to the target along the z axis.

The machine vision system 34 includes a general purpose computer 71, such as a model Globalyst 600 computer, which is commercially available from AT&T, U.S.A. The computer 71 is equipped with a machine vision processor 72, for example but not limited to, a model ITT ITEX OFG (overlay frame grabber) image processing card that is commercially available from Microdisk, Inc., U.S.A. The computer 71 and processor 72 communicate, as is indicated by reference arrow 73 in FIG. 3B. The machine vision system 34 further includes an amplifier 75 that is connected between the control line(s) of the computer and the FAM 39. The amplifier 75 receives control signals, as delineated by reference arrow 74, from the machine vision system 34, amplifies them, and provides amplified piezocontrol signals 41 within the voltage range of 0–100 volts to the piezoelectric FAM 39, as indicated by the reference arrow 41. A suitable amplifier is a model E860.10 amplifier manufactured by and commercially available from Physik Instrumente, Germany.

D. Second Embodiment Of The Inspection System

Figure 4A:
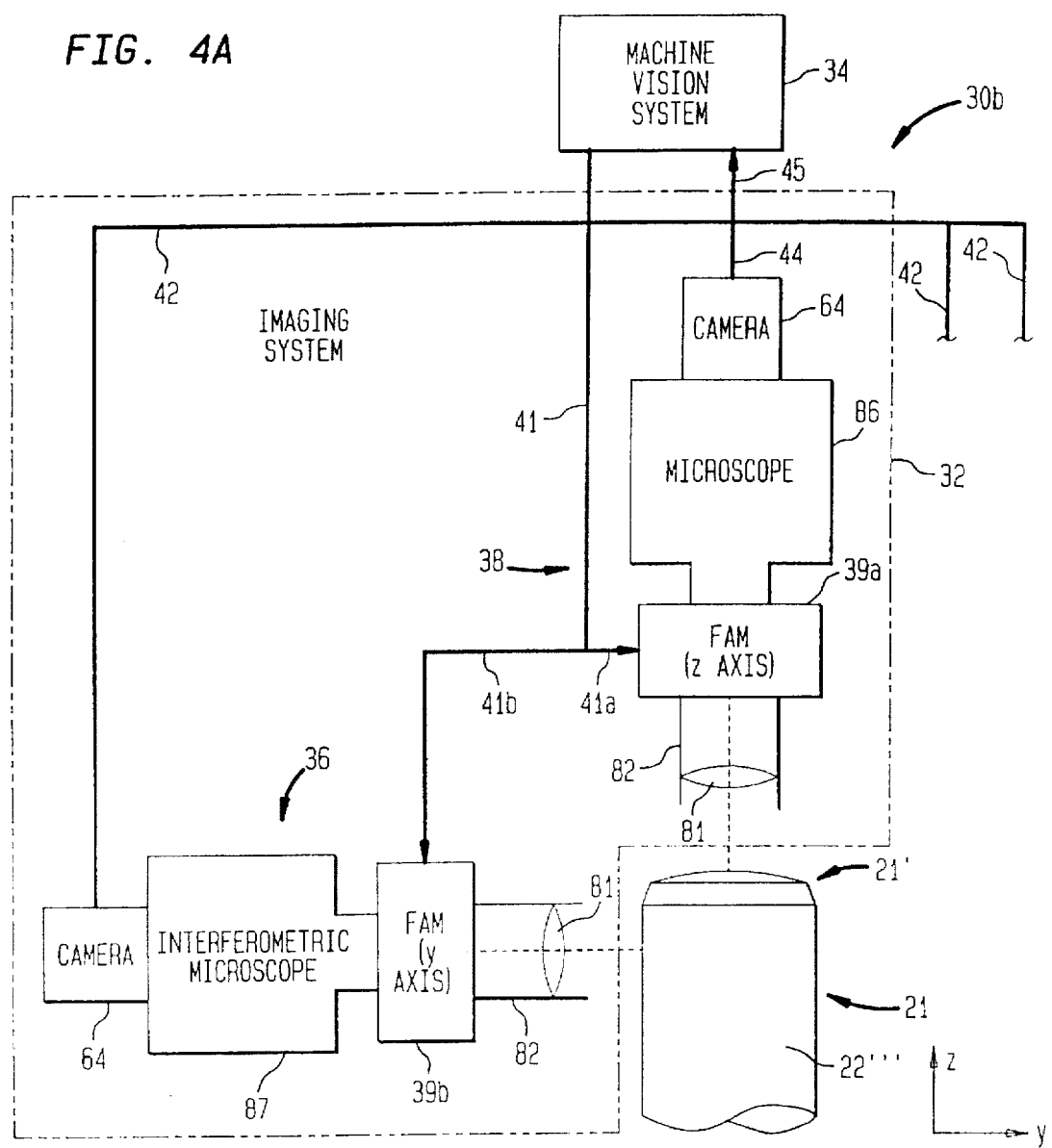
FIG. 4A is a block diagram illustrating a second embodiment of the inspection system of FIG. 2.
Figure 4B:
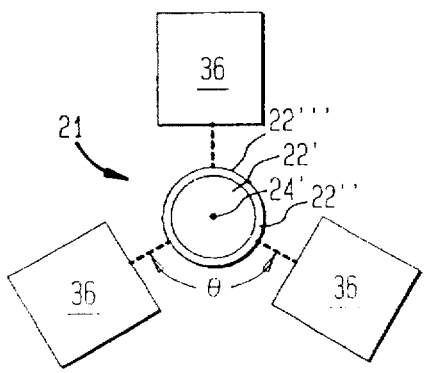
FIG. 4B is a block diagram illustrating placement of boundary segment imagers in the second embodiment of the inspection system of FIG. 4A.

A second embodiment of the automatic inspection system 30 of FIG. 2 is illustrated in FIGS. 4A and 4B, and is generally denoted by reference numeral 30b. The automatic inspection system 30b comprises a feature imager 38 and at least three boundary segment imagers 36, only one of which is shown in FIG. 4A for simplicity. The feature imager 38 and the boundary segment imagers 36 are mutually exclusive elements in hardware. The feature imager 38 is disposed over the core endface 28' (see FIG. 1B) and at a vantage point in line with the longitudinal z axis of the termination 21, while the boundary segment imagers 36 are disposed to view the alignment surface 22''' at an angle that is transverse and preferably perpendicular to the longitudinal z axis of the termination 21.

At least three boundary segment imagers 36 are needed for curve fitting purposes, as will be further described hereafter. Further, the boundary segment imagers 36 are preferably spaced symmetrically about the longitudinal z axis of the termination 21. Thus, in the case where there are three boundary segment imagers 36, as shown in FIG. 4B, adjacent boundary segment imagers 36 are spaced apart by an angle θ equal to about 120 degrees.

The feature imager 38 has an objective 81 suspended in a microscope tube 82 and positioned to be exposed to the termination endface 21' of the termination 21. The objective 81 can be any suitable lens configuration, but is preferably a single lens with a magnification of 40× and NA of 0.6. A FAM 39a is connected to the microscope tube 82 for moving the tube 82 and lens 81 along an z axis aligned with the longitudinal axis of the termination 21 under the control of the machine vision system 34 as indicated by arrows 41, 41a. The FAM 39a can be a piezoelectric translator, for example but not limited to, a model P721.00 piezoelectric translator manufactured by Physik Instrumente, Germany. A microscope 86 (including one or more lenses or other optical elements) is connected to the FAM 39a for receiving an image from the objective 81. The microscope 86 can be a model ME-3000, manufactured by Micro Enterprises, Inc., U.S.A. A camera 88 is mounted to the microscope 86 and is configured to receive an optical image from the microscope 86 and convert the optical image into an electrical signal. The camera 88 is any suitable CCD, such as a model KP-M1, which is commercially available from Hitachi, Japan.

Each boundary segment imager 36 is constructed as follows. Each boundary segment imager 36 has an objective 81 suspended in a microscope tube 82 and positioned to be exposed to the termination endface 21' of the termination 21. The objective 81 can be any suitable lens configuration, but is preferably a single lens with a magnification of 20× and NA of 0.4. A FAM 39b is connected to the microscope tube 82 for moving the tube 82 and lens 81 perpendicular to the longitudinal axis of the termination 21 under the control of the machine vision system 34 as indicated by arrows 41, 41b. The FAM 39b can be a piezoelectric translator, for example but not limited to, a model P721.00 piezoelectric translator manufactured by Physik Instrumente, Germany.

An interferometric microscope 87 is connected to the FAM 39b for receiving an image from the objective 81. A suitable interferometric microscope 87 is the model ME-3000c, which is manufactured by and commercially available from Micro Enterprises, Inc, U.S.A. The interferometric microscope 87 has an internal light source and an internal light reflection apparatus. It is known in the art that the interferometric microscope 87 can be used to measure very small distances and thicknesses using known wavelengths of light. Generally, in the interferometric microscope 87, a beam of light from the light source is separated into two opposing beam parts by partial reflections at the reflection apparatus. One beam part is projected against the target, returns to the interferometric microscope, and is reunited with the other beam part at the reflection apparatus. Because the beams have traversed different optical paths, the two components produce interference in the image of the target. Furthermore, the interference can be utilized to measure very small distances or thicknesses.

A camera 88 is mounted to the interferometric microscope 87 and is configured to receive an optical image (the combined image from the reflection apparatus) from the microscope 86 and convert the optical image into an electrical signal. The camera 88 is any suitable CCD, such as a model KP-M1, which is commercially available from Hitachi, Japan.

The machine vision system 34 is implemented with any suitable logic, processor, computer, or combination thereof, as previously described with reference to the first embodiment and best mode embodiment. The machine vision system 34 is configured to construct a combined image from the electrical signals provided by the cameras 64 of the three boundary segment imagers 36 and feature imager 38. The combined image includes the boundary segment(s) captured by the boundary segment imagers 36 and the feature captured by the feature imager 38. From this image, the eccentricity can be computed, as previously described. Note that in this embodiment that the boundary segment imagers 36 provide absolute distances. Moreover, boundary pixels are identified from the absolute distances measured by the boundary segment imagers 36, and a circle or other appropriate curve is fitted to the boundary pixels in order to determine $T_{ideal}$, $T_{test}$.

E. Third Embodiment Of The Inspection System

Figure 5:
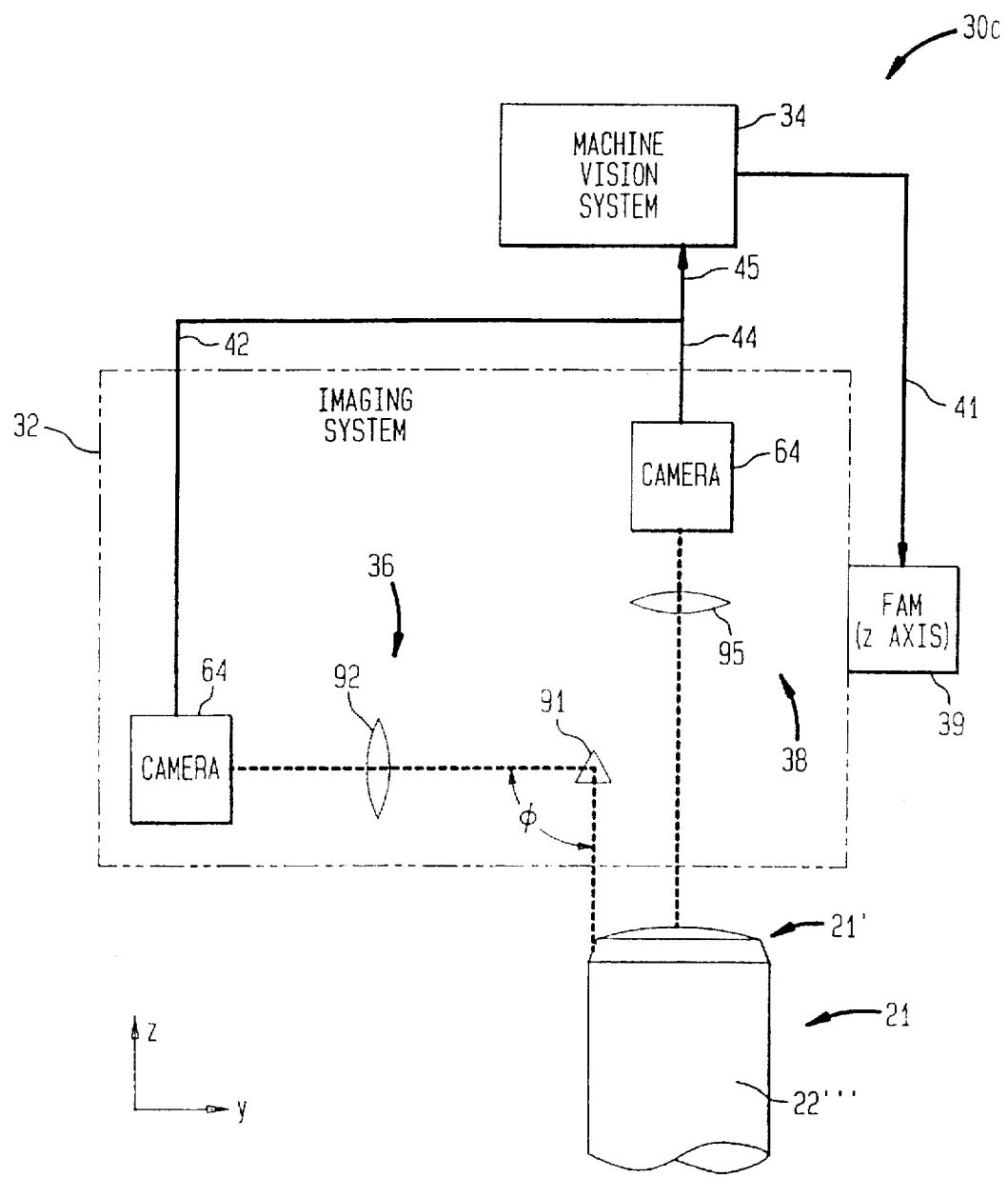
FIG. 5 is a block diagram illustrating a third embodiment of the inspection system of FIG. 2.

A third embodiment of the automatic inspection system 30 of FIG. 2 is illustrated in FIG. 5 and generally denoted by reference numeral 30c.

In the automatic inspection system 30c, each of the one or more boundary segment imagers 36 comprises a prism 91 positioned to capture a boundary segment image, an objective 92 mounted in relationship to the prism 91 to receive the boundary segment image, and a camera 64 for receiving the boundary segment image from the objective 92. In the preferred embodiment of the inspection system 30c, the prism 91 associated with each boundary segment imager 36 is a mirror prism having a silvered back adapted to communicate a boundary segment image at approximately a 90° angle toward the objective 92. In other words, the angle φ between the incident light and objective axis is about 90°. Further, the camera 64 is preferably a CCD, for example but not limited to, a Hitachi model KP-M1 CCD.

The feature imager 38 of the inspection system 30c includes an objective 95 positioned along an axis aligned longitudinally with the termination 21 in order to capture an image of the feature of interest and pass the feature image to the camera 64, for example but not limited to, a Hitachi model KP-M1 CCD. Furthermore, the imaging system 32 is moved relative to the termination 21 for focusing purposes via a FAM 39.

The FAM 39 is adapted to move the entire imaging system 32, including the prism(s) 91, objective(s) 92, objective 95, and cameras 64 so that the optical arrangement is maintained, while the focus of the system relative to the termination endface 21' is changed. Thus, all elements of the feature imager 38 and the boundary segment imager 36 are part of a common metrology frame that is moved by the FAM 39 with respect to the termination endface 21'. A suitable FAM 39 is a piezoelectric translator, for example but not limited to, a model P721.00 piezoelectric translator manufactured by Physik Instrumente, Germany.

The machine vision system 34 can be any suitable logic, processor, computer, or combination thereof, as previously described, that can analyze the images generated by the imaging system 32 and that can control the focus of the imaging system 32 via control of the FAM 39. In the preferred embodiment, the machine vision system 34 combines the boundary segment images with the feature image to generate the combined image for eccentricity analysis.

F. Fourth Embodiment Of The Inspection System

A fourth embodiment of the automatic inspection system 30 of FIG. 2 is illustrated in FIG. 6 and generally denoted by reference numeral 30d.

In the inspection system 30d, each of the one or more boundary segment imagers 36 and the feature imager 38 share hardware. Specifically, the imaging system 32 comprises an objective 101 centered about and along an z axis aligned with the termination 21 for receiving a feature image and the one or more boundary segment images. In the preferred embodiment, the objective 101 has the largest NA possible for fields of view of about 2.7 mm and a magnification of about 10×.

A camera 64a is positioned to receive the feature image from the objective 101, and one or more cameras 64b are positioned to receive a corresponding boundary segment image from the objective 101. In turn, each camera 64a, 64b converts its corresponding image into an electrical signal that is passed to the machine vision system 34, as is indicated by the reference arrow 45. The cameras 64a, 64b are essentially custom made CCD devices, each being basically the same size and each preferably having a scan of 480×32 pixels.

The imaging system 32 is secured to a FAM 39, which is controlled by the machine vision system, as indicated by the reference arrow 78. The FAM 39 moves the imaging system 32, including the objective 101 and cameras 64a, 64b, along the z axis aligned with the termination 21 for focusing the objective 101 on the termination endface 21'. A suitable FAM 39 is a piezoelectric translator, for example but not limited to, a model P721.00 piezoelectric translator manufactured by Physik Instrumente, Germany.

The machine vision system 34 can be any suitable logic, processor, computer, or combination thereof, as previously described, that can analyze the combined image generated by the imaging system 32 and that can control the focus of the imaging system 32 via control of the FAM 39. In the inspection system 30d, the machine vision system 34 reads in data signals from all of the cameras 64a, 64b as if all of the cameras 64a, 64b were a single CCD device to create a combined image of 480×480 pixels. In other words, the output from each camera 64a, 64b represents a portion of the combined image.

III. ALIGNMENT OF THE TERMINATION ENDFACE

In order to capture appropriate images for analysis by the machine vision system 34, the termination endface 21' should be appropriately aligned with the imaging system 32 of the corresponding inspection system (FIGS. 2–6). The termination endface 21' can be aligned with the imaging system 32 using any of numerous possible mechanical mechanisms that are known in the art. Several feasible embodiments for alignment are described hereafter, as examples.

A. First Embodiment For Alignment

In a first embodiment for alignment, the termination endface 21' is aligned with the imaging system 32 using a V-shaped block. An example of the V-shaped block is illustrated and described in U.S. Pat. No. 4,738,508 to Palmquist. The V-shaped block is disposed to align the termination endface 21' along the x, y axes. Moreover, a rim may be disposed at an end of the block or a protrusion may be disposed to extend outwardly from a support surface of the V-shaped block to serve as a stop for the termination endface 21', so as to align the termination endface 21' along the z axis.

B. Second Embodiment For Alignment

In a second embodiment for alignment, the termination endface 21' is aligned with the imaging system 32 using an alignment body, such as a cylindrical sleeve, having a cylindrical aperture for receiving and guiding the alignment surface 22''' of the termination 21. The aperture aligns the termination endface 21' along the x, y axes. Moreover, a rim may be disposed at an end of the body or a protrusion may be disposed to extend outwardly from a surface defining the aperture to serve as a stop for the termination endface 21', so as to align the termination endface 21' along the z axis.

C. Third Embodiment For Alignment

A third embodiment for alignment of the termination endface 21' is the best mode known at present for practicing the present invention. It enables lighting of the termination endface 21' without the need for launching light through the fiber 24. Further, it is particularly suited for a ferrule termination 21, because it accommodates for the bevelled chamfer 22'', i.e., for the situation where the boundary segment(s) and the feature are in different focal planes. Moreover, the third embodiment is particularly suited for use with four boundary segment imagers 36, although a lesser number can be utilized, as will be apparent from the discussion hereafter.

Figure 7A:
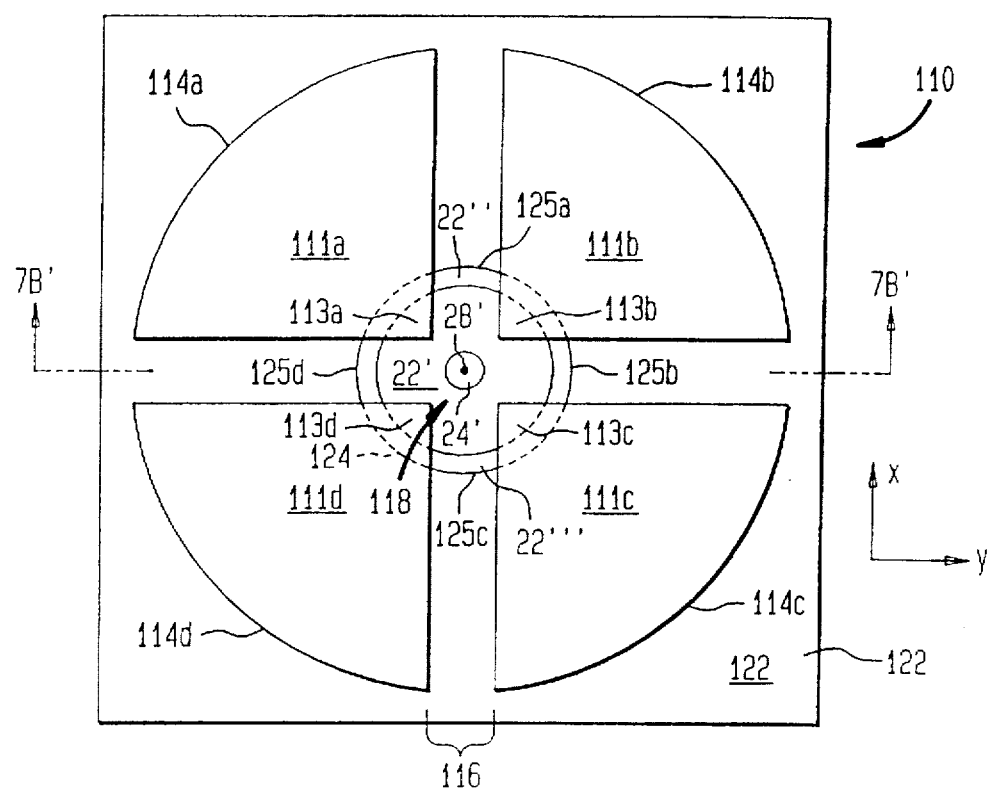
FIG. 7A is a front view of an alignment apparatus for aligning a ferrule optical fiber termination to be analyzed by the inspection system of FIG. 2.
Figure 7B:
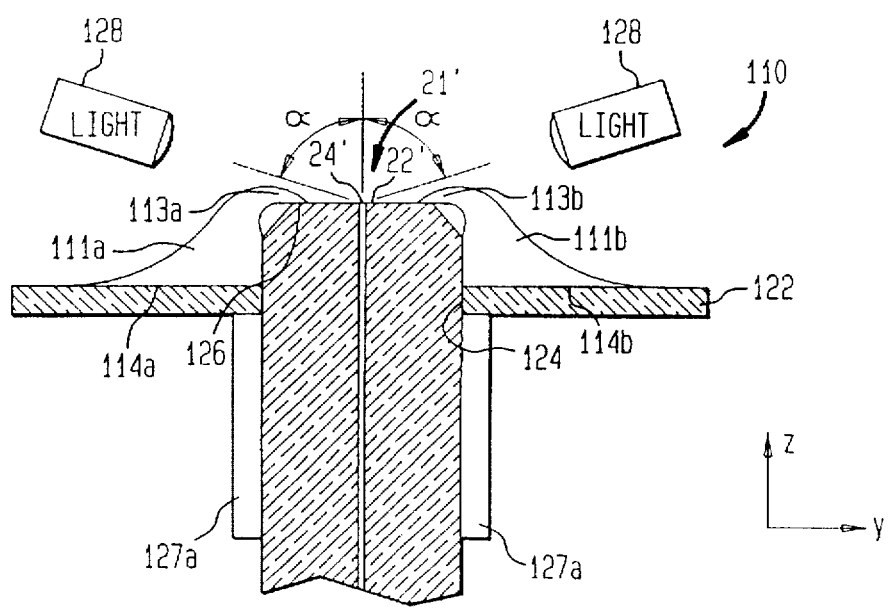
FIG. 7B is a cross-sectional view of the alignment apparatus of FIG. 7A taken along line 7B'–7B'.
Figure 7C:
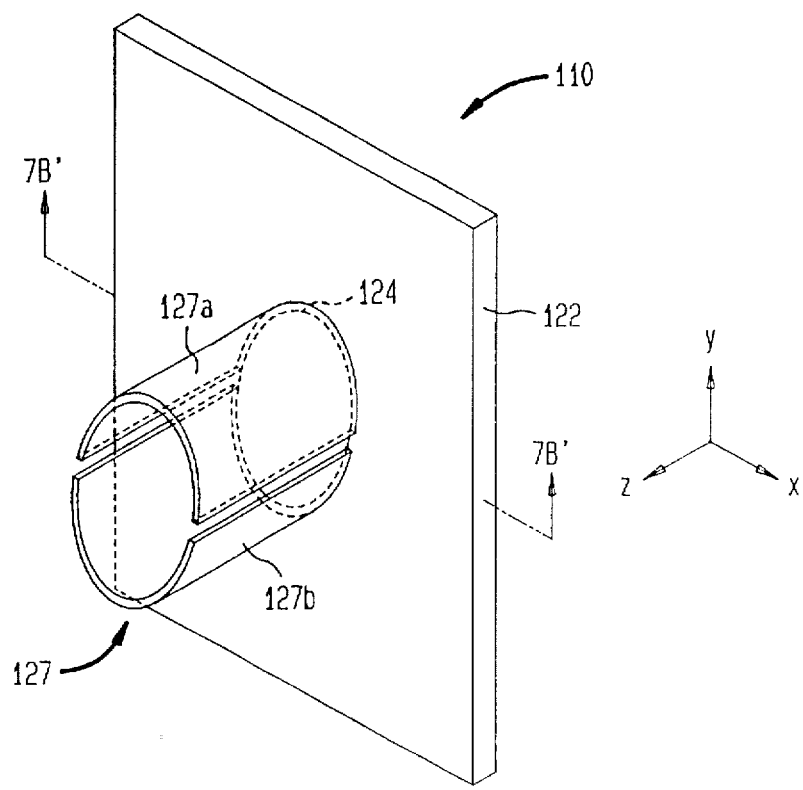
FIG. 7C is a rear perspective view of the alignment apparatus of FIG. 7A.

The third embodiment for alignment uses a novel alignment apparatus 10, as is illustrated in FIGS. 7A, 7B, and 7C. In structure, the alignment apparatus 110 comprises a plurality of rigid alignment arms, preferably four alignment arms 111a–111d. From the front view in FIG. 7A, each of the alignment arms 111a–111d appears as a body spanning the area of a quarter circle. The alignment arms 111a–111d have distal ends 113a–113d, respectively, and mounted ends 114a–114d, respectively. As further shown in FIG. 7A, the alignment arms 111a–111d are spaced apart via spacings 116, and each of the distal ends 113a–111b converges toward and defines a throughway, or aperture, 118. The aperture 118 has a diameter that is larger than the diameter of the fiber endface 24' and that is smaller than the diameter of the plug endface 22' so that the plug endface 22' engages the distal ends 113a–111d of the respective alignment arms 111a–111d, while the fiber endface 24' and a portion of the plug endface 22' therearound is fully exposed. Thus, the distal ends 113a–111d of the alignment arms 111a–111d position the termination endface 21' along the longitudinal z axis of the termination 21 relative to the imaging system 32.

In the preferred embodiment, the radius (typically, 18 mm nominal) of curvature of the distal ends 113a–113d of the alignment arms 111a–111d is generally the same as that for the plug endface 22' so that the distal ends 113a–113d firmly engage the plug endface 22' in a surface-to-surface manner without damage (e.g., marring, indentation, etc.) to the plug endface 22'. The aforementioned construction is illustrated in FIG. 7B at reference numeral 126.

The alignment arms 111a–111d can be mounted in any suitable manner, but are preferably mounted to a rigid stationary plate 122 at their mounted ends 114a–114d. The stationary plate 122 has a substantially circular orifice 124 with an appropriate diameter to permit passage of the termination 21 therethrough so that the plug endface 22' can be engaged by the distal ends 113a–113d of the alignment arms 111a–111d. The center of the plate orifice 124 is substantially aligned with the center of the aperture 118. In the preferred embodiment, the plate orifice 124 measures about 2.5 mm in diameter and is positioned about 2 mm away from the inside surface of the arms 111 at the aperture 118.

In order to align the termination endface 21' along the x, y axes relative to the imaging system 32, the rear surface of the stationary plate 122 is equipped with an elongated cylindrical split sleeve 127 having opposing sleeve halves 127a, 127b, as shown in FIG. 7C. The sleeve 127 can be made from any rigid material and is secured to the plate 122 via any appropriate mechanism or bonding agent or is produced as an integral part of the plate 122. The plate orifice 124 is aligned with the internal throughway defined by the sleeve 127 so that the termination 21 can be inserted within the sleeve 127 and through the orifice 124 and the alignment surface 22''' is guided by the sleeve halves 127a, 127b and orifice 124 along the x, y axes.

As a result of the configuration of the alignment apparatus 110, when the termination 21 is engaged with the alignment apparatus 110, the fiber endface 24' is aligned in along the z axis by the arms 111 and along the x, y axes by the sleeve 127, and furthermore, the fiber endface 24' (as well as a portion of the plug endface 22' therearound and the core endface 28') and four boundary segments 125a–125d are entirely exposed to the imaging system 32 (FIG. 2).

IV. LIGHTING OF THE TERMINATION ENDFACE

In order to capture appropriate images for analysis by the machine vision system 34 (FIGS. 2–6), the termination endface 21' should be sufficiently illuminated with light from a natural or artificial source. Several examples of possible lighting arrangements are described hereafter.

A. First Embodiment For Lighting

A first embodiment for lighting is suitable for any type of termination 21, including both the ferrule and biconic terminations 21. In the first embodiment, light is launched through the optical fiber 24 toward the termination endface 21' under test using any suitable light source. The light may be launched from another termination 21 of or other interface to the optical fiber cable having the termination endface 21' under test. With this lighting configuration, the regions of the core endface 28', the fiber endface 24', plug endface 22', alignment surface 22''', and background surrounding the alignment surface 22''' will exhibit varying degrees of light intensity, and clear lines of demarkation exist between the aforementioned regions. These clear lines of demarkation enable accurate determination of the eccentricity of the core endface 28' relative to the alignment surface 22'''. Although the foregoing lighting configuration works well, it may sometimes be impractical to launch light along the fiber 24 toward the termination endface 21'.

B. Second Embodiment For Lighting

A second embodiment for lighting is suitable and practical for a termination 21 having a plug made from an opaque material or material that does not transmit an appreciable amount of light. Biconic terminations 21 typically have a plug made from epoxy or plastic, which both do not propagate light very well, and therefore, this lighting embodiment can be used effectively in connection with the biconic termination 21. However, this lighting embodiment is not desirable for the ferrule termination 21, because a ferrule termination 21 typically has a plug made from zirconia ($Zr_2O_3$) or alumina ($Al_2O_3$), which both are highly reflective of light. The intensity of light reflected from the $Zr_2O_3$ or $Al_2O_3$ is often sufficient to saturate the camera CCD element and reduce its ability to produce an image that allows discrimination of the core boundary.

Generally, in the second embodiment for lighting, light is projected directly at the termination endface 21' from any or all angles relative to the longitudinal z axis of the termination 21. With this lighting configuration, the regions of the core endface 28', the alignment surface 22''', and background surrounding the alignment surface 22''' will exhibit varying degrees of light intensity, and clear lines of demarkation exist between the aforementioned regions. These clear lines of demarkation enable accurate determination of the eccentricity of the core endface 28' relative to the alignment surface 22'''.

C. Third Embodiment For Lighting

A third embodiment for lighting of the termination endface 21' does not require the launching of light along the fiber 24 toward the endface 21' and is the best mode, known at present, for practicing the present invention. The third embodiment is particularly suited for the third embodiment for alignment, i.e., the alignment apparatus 110 of FIGS. 7A–7C, when used in connection with a termination 21 having a plug made from a translucent material or material capable of some degree of light transmission. Ferrule terminations 21 typically have a plug made from zirconia ($Zr_2O_3$) or alumina ($Al_2O_3$), which both can propagate light, and therefore, this lighting embodiment can be used effectively in connection with the ferrule termination 21.

The third embodiment for lighting comprises a plurality of light sources 128, for example but not limited to, fiber optic bundles, situated over the alignment arms 111a–111d of the alignment apparatus 110 so that light passes through the spacings 116 and aperture 118 and impinges upon the boundary segments 125a–125d and upon the plug endface 22', fiber endface 24', and core endface 28'. In the preferred embodiment, there is one light source situated over each spacing 116 and exposed at an angle α from an z axis passing through the termination endface 21. The angle α is preferably greater than about 70° because the acceptance angle of the fiber 24 is less than 5°. Because of the foregoing configuration, the fiber 24 absorbs virtually no light, and light impinging upon the termination endface 21' from the light sources 128 is scattered throughout the plug 24 and cladding 27 of the fiber 24. The scattering light passes back out from the beveled chamfer 22" and the plug endface 22', and the cladding 27 endface, but does not scatter from the core endface 28'. A reason that light does not scatter out from the core endface 28' is that the light propagation characteristics of the core 28 are much different than those of the cladding 27 and the plug 22. In other words, the core endface 28' appears much darker than the surrounding cladding and plug. Furthermore, the stationary plate 122 is equipped with the plate orifice 124 having an appropriate size to prevent light from approaching the core 28 at a low enough angle to enter the core 28 and reflect back from a remote end toward the termination endface 21' under test.

The combination of the novel alignment apparatus 110 and its associated light sources 128 has the following advantages. The fiber endface 24' is directed to a predetermined position with respect to the inspection system (FIGS. 2–6). The alignment apparatus 110 does not make any physical contact with the fiber endface 24'. The endface boundary of the alignment surface 22'" of the termination 21 does not have to be in the same focal plane as the fiber endface 24' and simultaneous imaging can still take place. Finally, the fiber core 24 does not have to be illuminated from another end of the termination 21 under test.

V. COMBINED IMAGES

The combined images that can be captured and generated by the imaging system 32 (FIGS. 2–6) of the inspection system (FIGS. 2–6) will now be described. The combined images enable accurate computation of the offset of the object feature relative to the boundary of the object, and particularly, in the case of the termination 21, the eccentricity of the core endface 24' relative to the alignment surface 22'", despite the fact that the alignment surface 22'" is much larger than the core endface 24'. Indeed, the alignment surface 22'" typically measures about 2500 microns in a ferrule termination 21, whereas the core endface 24' measures between about 8 and about 50 microns. Furthermore, it should be noted that the images described hereafter may be displayed on the output device 46 (FIG. 2) by the machine vision system 34 (FIGS. 2–6), if desired, with additional overlay images, if desired.

Figure 8:
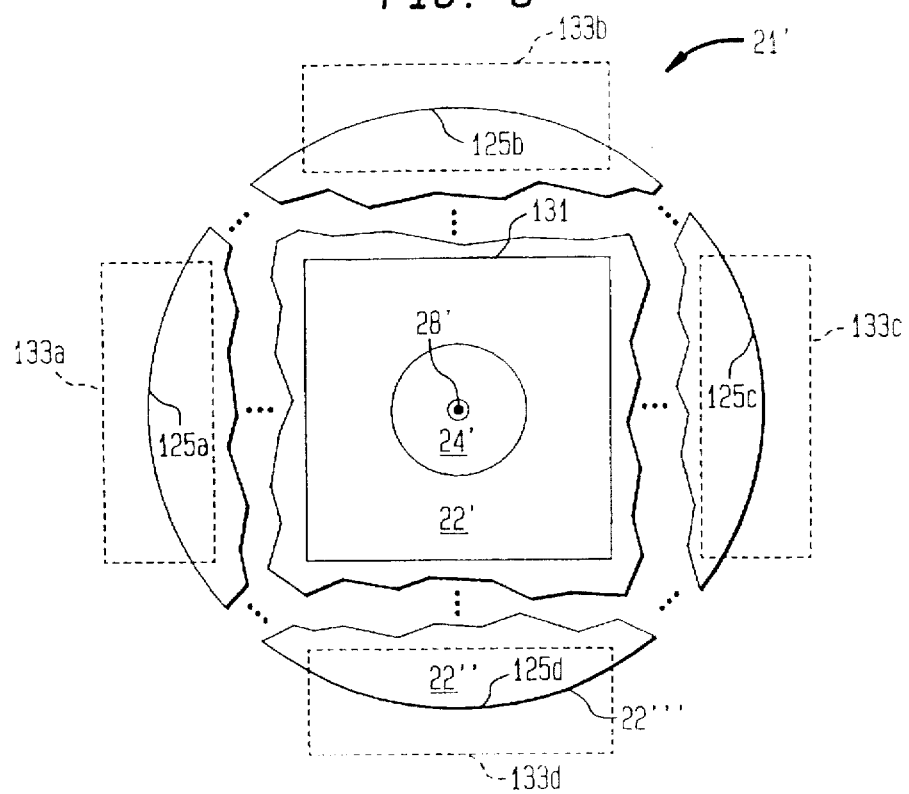
FIG. 8 is a schematic diagram illustrating the termination endface and the various separate regions that are imaged by the inspection system of FIG. 2.

FIG. 8 schematically shows the termination endface 21' with an overlay of the feature image 131 that is captured by the feature imager 38 (FIG. 2). As shown, the feature image 131 is large enough to encompass the fiber endface 24' (both the core endface 28' and the cladding endface 27') and a portion of the surrounding plug endface 22', but is not sufficiently large enough to capture the entire termination endface 21' and, particularly, the alignment surface 22'". The one or more boundary segments imagers 36 (FIG. 2) are configured to capture a respective boundary segment image 133a–133d that includes respective boundary segments 125a–125d. In the case when more than one boundary segment imager 36 is employed, the boundary segment imagers 36 should be positioned to capture boundary segment images 133 that are spaced symmetrically about the core endface 28'. In the preferred embodiments, four boundary segment imagers 36 are utilized, and they are configured to capture the boundary segment images 133a–133d, as shown in FIG. 8.

FIGS. 9A–9D show various combined images 136a–136d, as nonlimiting examples, to illustrate the variations in combined images that can be retrieved by the inspection system 30, depending upon the particular implementation (systems 30a, 30a', 30c, 30d). Any of the images 136a–136d can be utilized by the machine vision system 34 to determine the offset, or eccentricity.

Figure 9A:
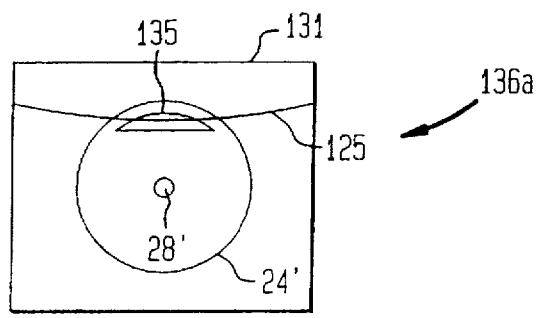
FIGS. 9A through 9D are schematic diagrams of combined images (and perhaps display images) that can be formed and analyzed by the inspection system of FIG. 2; particularly.
Figure 9B:
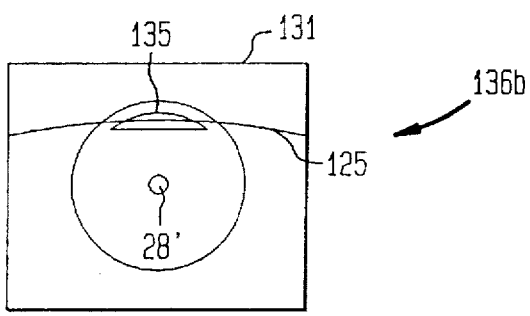

More specifically, FIGS. 9A and 9B illustrate respective combined images 136a, 136b having a single boundary segment image superimposed over a feature image. To generate the foregoing image, a single boundary segment imager 36 (FIG. 2) and a feature imager 38 (FIG. 2) are utilized. FIG. 9A shows a combined image 136a derived from a core image 131 and an inverted boundary segment image 133, whereas FIG. 9B shows a combined image 136b derived from a core image 131 and a noninverted boundary segment image 133.

Figure 9C:
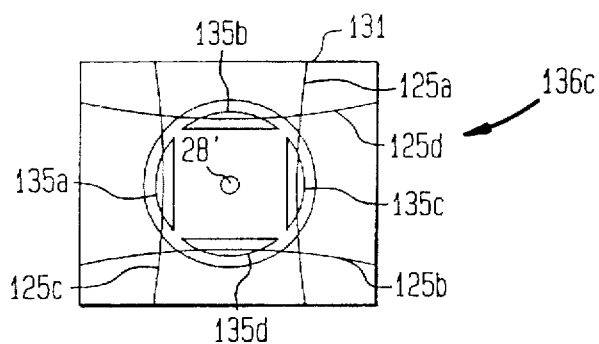
Figure 9D:
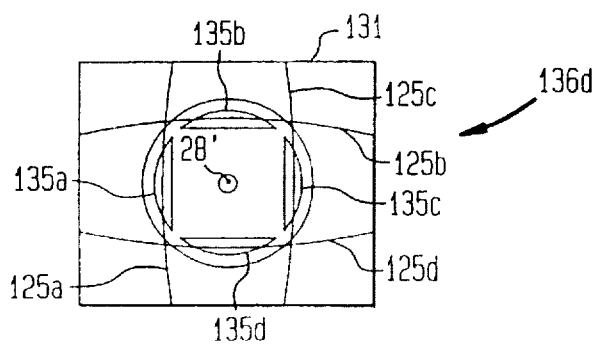

FIGS. 9C and 9D show combined images 136c, 136d with four boundary segment images 133 superimposed over the feature image 131, in accordance with the preferred embodiments. FIG. 9C shows the best mode of the invention and shows a combined image 136c derived from a core image 131 and four inverted boundary equally-spaced segment images 133a–133d. FIG. 9D shows a combined image 136d derived from a core image 131 and four noninverted equally-spaced boundary segment images 133a–133d. As mentioned, utilization of more than one boundary segment image 133 enhances the accuracy of the eccentricity calculation.

Finally, it should be noted that the inspection systems 30a, 30a' (FIGS. 3A, 3B, respectively) are configured to capture and generate the images 136a, 136c (FIGS. 6A, 6C, respectively), whereas the inspection systems 30c, 30d (FIGS. 5, 6, respectively) capture and generate the images 136b, 136d (FIGS. 6B, 6D, respectively).

VI. INSPECTION METHOD

A novel inspection method 140 for configuring and driving the machine vision system 34 (FIGS. 2–6) is set forth in FIGS. 7A through 7B. In essence, the inspection method 140 causes the inspection system 30 to focus the imagers 36, 38 on the object under test, analyzes the captured combined image 136, and determines the eccentricity based upon the location of the boundary segment(s) 125 relative to the core endface 28' within the combined image 136.

Initially, as indicated in the flow chart block 141, the termination endface 21' is presented to the imaging system 32 (FIG. 2–6) of the inspection system 30. If a ferrule termination is to be tested, then the alignment apparatus 110 (FIGS. 7A, 7B) is preferably utilized to align the termination endface 21'. An input is also provided to the system 30 by the user to indicate whether the termination endface 21' corresponds to an ideal termination 21 (i.e., a reference termination with substantially zero eccentricity) or a termination 21 to be tested. Obviously, the system 30 can be configured to assume a test termination, unless otherwise specified by the user. If an ideal termination endface 21' is present, then the algorithm 140 will perform a calibration routine, as will be described hereinafter.

Next, a combined image 136 is acquired and stored by the machine vision system 34, as denoted in the flow chart blocks 142, 143, 144a. In order to acquire the image with optimal focus, the FAM 39 is utilized to move the imagers 36, 38 relative to the termination endface 21' by increments, and after movement by each increment, the focus of the combined image is checked via gradient analysis. The gradient is the change, or difference in value, between a pixel value and the value of an adjacent pixel along a particular direction. Preferably, the FAM 39 is initialized so that the imagers 36, 38 are located the furthest distance away from the termination endface 21', and then the imagers 36, 38 are moved incrementally toward the termination endface 21', while monitoring gradient changes in the combined image 136.

After it is determined that the focus peak has been passed after movement by an increment, the FAM 39 is controlled to move the imagers 36, 38 back to the optimal focus position, as is indicated in the flow chart blocks 143, 144b.

The core endface center $C(x_0, y_0)$ (either $C_{ideal}$ or $C_{test}$) of the core endface 28' is calculated and the center x,y coordinates are saved, as denoted in flow chart block 145. The center $C(x_0, y_0)$ is identified using any appropriate analysis of the combined image 131, for example, gradient analysis. Furthermore, the coordinates x,y are based upon the image boundary of the combined image 131.

As delineated in the flow chart block 146, a search area 135 (FIGS. 9A-9D) is defined in the combined image 131 for each of the boundary segments 125 that exist in the combined image 136. In the preferred embodiments, each search area 135 is a region having a circular side and a linear side and is disposed within the boundary of the fiber endface 24'. One reason that each search area 135 is confined to a region within the outer boundary of the fiber endface 24' is that this placement minimizes possible adverse effects resulting from noise that will exist around the fiber boundary. Moreover, in the best mode, there are four search areas 135a–135d that are defined equidistant about the image of the core endface 28' for the purpose of searching for each of four boundary segments 125a–125d, respectively.

Next, as indicated in the flow chart block 147, localized gradient searches are performed via normal scans across each search area 135 in order to identify the location of the boundary segment 125 within each search area 135. More specifically, lines that are transverse to the boundary segment 125 are scanned and analyzed by examining the changing gradient between adjacent pixel values. From the foregoing analysis, the location of the boundary segment 125 can be identified in each search area 135.

In order to ensure the integrity of the determination of the boundary segment location, the inspection method 140 ensures that the outer boundary segment(s) 125 are in optimal focus. In order to ensure optimal focus, the gradient searches are performed iteratively after the FAM 39 has been adjusted to move the imaging system 32 along the z axis, and after each adjustment by the FAM 39, the gradients for each search area 135 are summed and compared to a previous value in order to determine a peak value. Once a peak value has been identified by passing the peak value, the FAM 39 is caused to retract so that the optimal focus point is achieved for the outer boundary segments 125. The foregoing process is indicated in flow chart blocks 148–151.

As indicated in the flow chart block 152, a curve (e.g., circle, ellipse, etc.) is fitted in two dimensions (in x, y plane) to each boundary segment 125 by iteratively scanning through several fits and choosing the one with the least squares error. In the preferred embodiment, a circle of a known diameter (in the best mode, 2.5 mm) is fitted to each boundary segment.

After a curve has been fitted to each boundary segment 125, a determination is made as to whether the termination 21 is an ideal termination 21 or a test termination 21, as indicated in flow chart block 154. The ideal termination 21 is used for calibration of the inspection system 30 and is basically a termination 21 with minimal eccentricity (as close to zero as possible), as determined by any other suitable process, such as any of those indicated in the background section of this document. The presence of an ideal termination is input to the machine vision system 34 by the user during initialization of the inspection system 30, as indicated in the flow chart block 141.

If an ideal termination 21 is present, then the inspection method 140 performs a calibration method, as indicated in flow chart block 155 and then transfers back to flow chart block 141 and remains ready for analysis of a test termination 21, if desired. Alternatively, if at flow chart block 154 a test termination 21 is present, then the inspection method 140 determines the eccentricity using an eccentricity determination method, in accordance with flow chart block 156, and then the method 140 concludes. First and second embodiments for the calibration and eccentricity determination procedure are described hereafter.

A. First Embodiment For Calibration And Eccentricity Determination

The manner in which the eccentricity is determined depends upon the manner in which the inspection method 140 is calibrated. The first embodiment for calibration and eccentricity determination will be described with reference to FIGS. 11–13. In this regard, a calibration method 155' is shown in FIG. 11, and a corresponding eccentricity determination method 156' is illustrated in FIG. 12. The second embodiment for calibration and eccentricity determination will be described with reference to FIGS. 14–16. In this regard, a calibration method 155" is shown in FIG. 14, and an eccentricity determination method 156" is illustrated in FIG. 15. It should be noted that the second embodiment for calibration and eccentricity determination constitutes the best mode known at present for practicing the present invention.

1. Calibration Method

Figure 10A:
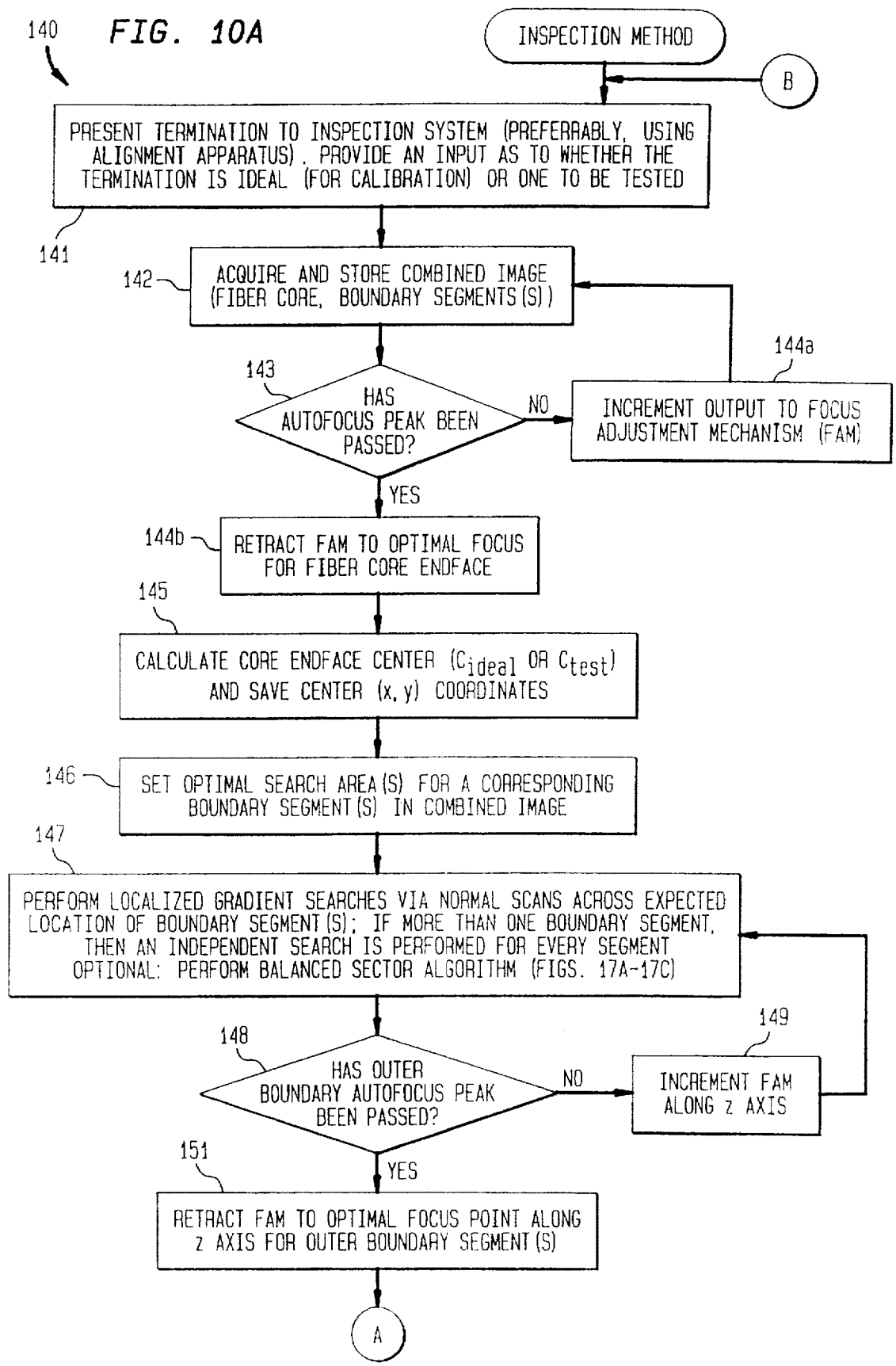

The calibration method of the first embodiment is shown in FIG. 11 and is denoted by reference numeral 155'. With reference to FIG. 11, the calibration method 155' establishes an ideal termination endface center $T_{ideal}(x_1, y_1)$ for the ideal termination 21, pursuant to flow chart block 155a'. FIG. 13 graphically illustrates the ideal core endface center $C_{ideal}(x_0, y_0)$ (determined earlier as indicated in flow chart block 145 of FIG. 10A) and the ideal termination endface center $T_{ideal}(x_0, y_0)$ as well as other graphical features that will be referred to hereafter. The ideal termination endface center $T_{ideal}(x_1, y_1)$ is determined as follows. If there is only one fitted curve (i.e., only one boundary segment image) from the previous step indicated at flow chart block 152 (FIG. 10A), then the ideal termination endface center $T_{ideal}(x_1, y_1)$ is the center of the single fitted curve. In contrast, if there is more than one fitted curve, then the center for each fitted curve is determined, and the ideal termination endface center $T_{ideal}(x_1, y_1)$ of the ideal termination endface 21' is determined by any suitable mathematical average of fitted curve centers. Next, as denoted in flow chart block 155b' of FIG. 12 and as further shown in FIG. 13, the ideal core endface center $C_{ideal}(x_0, y_0)$, which was determined earlier as indicated in flow chart block 145 of FIG. 10A, is retrieved, and a distance vector $d_{ideal}$ (vectors are indicated in bold herein; each vector has a magnitude and direction) between the ideal core endface center $C_{ideal}(x_0, y_0)$ and the ideal termination endface center $T_{ideal}(x_1, y_1)$ is computed. The distance vector $d_{ideal}$ is saved as an ideal reference for use in future eccentricity analysis of other test terminations 21, as indicated in flow chart block 155c'. Finally, the inspection method 140 transfers back to flow chart block 141 and remains ready for analysis of a test termination 21, if desired.

2. Eccentricity Determination Method

The eccentricity determination method of the first embodiment is set forth in detail in FIG. 12 and is denoted by reference numeral 156'. A termination endface center $T_{test}(x_1', y_1')$ is initially established for the termination endface 21 under test, pursuant to flow chart block 156a' of FIG. 12 and as illustrated in FIG. 13. If there is only one fitted curve, then the termination endface center $T_{test}(x_1', y_1')$ is the center of the fitted curve. In contrast, if there are more than one fitted curves, then the center for each fitted curve is determined, and the termination endface center $T_{test}(x_1', y_1')$ center of the test termination 21 is determined by any suitable mathematical average of fitted curve centers. Note that in the case of a single fitted curve for locating the termination endface center $T_{test}(x_1', y_1')$, the boundary points should be fitted exactly to the boundary image to allow for possible diameter variation of the termination boundary. This restriction does not apply to the best mode because in the best mode curves are fitted to multiple boundary segments, and this feature enables averaging out any possible termination diameter variations.

Figure 13:
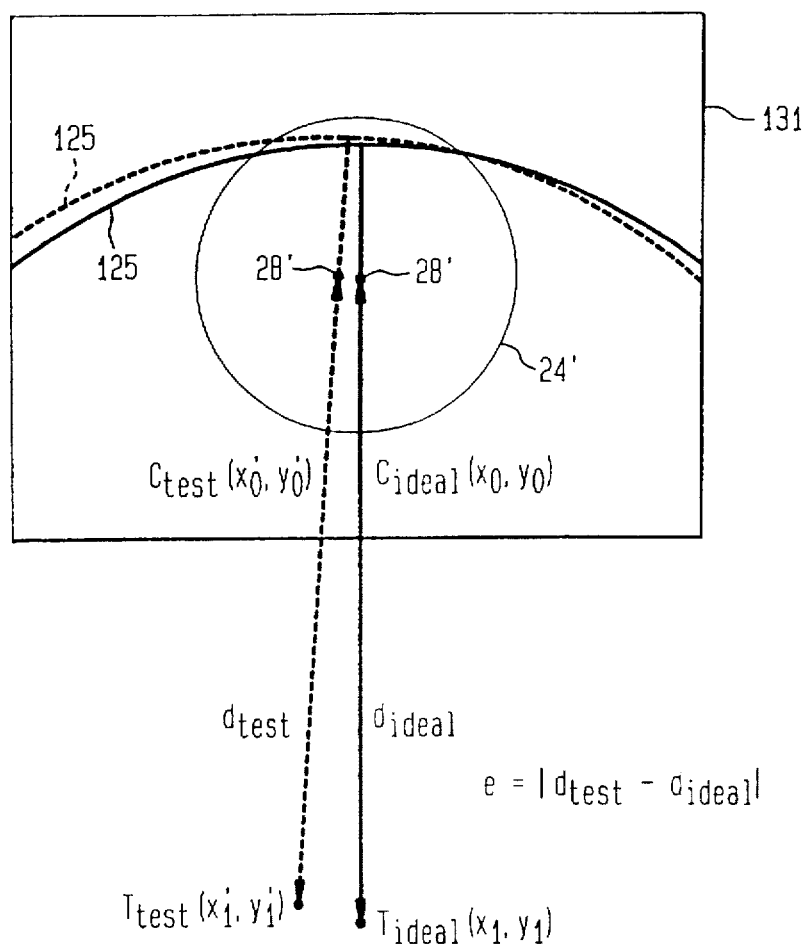
FIG. 13 shows a graph that illustrates the first embodiment for calibration and eccentricity determination of FIGS. 11 and 12.

Next, as indicated in flow chart block 156b' of FIG. 12 and as further shown in FIG. 13, the actual core endface center $C_{test}(x_0', x_0')$ is retrieved, and a distance vector $d_{test}$ between the core endface center $C_{test}(x_0'y_0')$ and the termination endface center $T_{test}(x_1', y_1')$ is computed. Furthermore, as denoted in flow chart block 156c', the eccentricity vector e is determined by computing the absolute value of the difference between the distance vector $d_{test}$ and the ideal reference distance vector $d_{ideal}$, or $e=|d_{test}-d_{ideal}|$. The eccentricity is then determined from the eccentricity vector e as the magnitude thereof. If the magnitude is determined in terms of pixels, then it can be converted, if desired, from pixels to an absolute distance (e.g., microns). It should be noted that the distance vectors $C_{ideal}$, $d_{test}$ can be represented in or converted to terms of absolute linear distances (e.g., microns) prior to the eccentricity vector determination so that the eccentricity vector determination directly yields a magnitude in terms of absolute distance.

The angle of the eccentricity vector e is also of relevance in that it represents the spatial relationship of the pixels $C_{test}(x_0', y_0')$ and $C_{ideal}(x_0', y_0')$ and can be identified from the distance vectors and displayed on the output device 46 (FIG. 2), if desired.

B. Second Embodiment For Calibration And Eccentricity Determination

The second embodiment for calibration and eccentricity determination is now described with reference to FIGS. 14–16. Specifically, a calibration method 155" is shown in FIG. 14, and a corresponding eccentricity determination method 156" is illustrated in FIG. 15. The second embodiment for calibration and eccentricity determination constitutes the best mode known at present for practicing the present invention. Unlike the first embodiment, the second embodiment accounts for and corrects nonlinearities in the imaging system 32 (FIG. 2), resulting from the fact that the combined image 136 contains information collected from separate optical imagers 36, 38, and thus optimally relates the position of the boundary segments 125 to the core endface 28'.

To practice the second embodiment, the imaging system 32 should have two or more boundary segment imagers 36, but preferably an even number to simplify the mathematics. Further, for purposes of simplicity in this discussion, the second embodiment will be described hereafter with reference to four boundary segment imagers 36 and an orthogonal Cartesian coordinate system x, y, z, which constitutes the preferred embodiment and best mode.

1. Calibration Method

Figure 14:
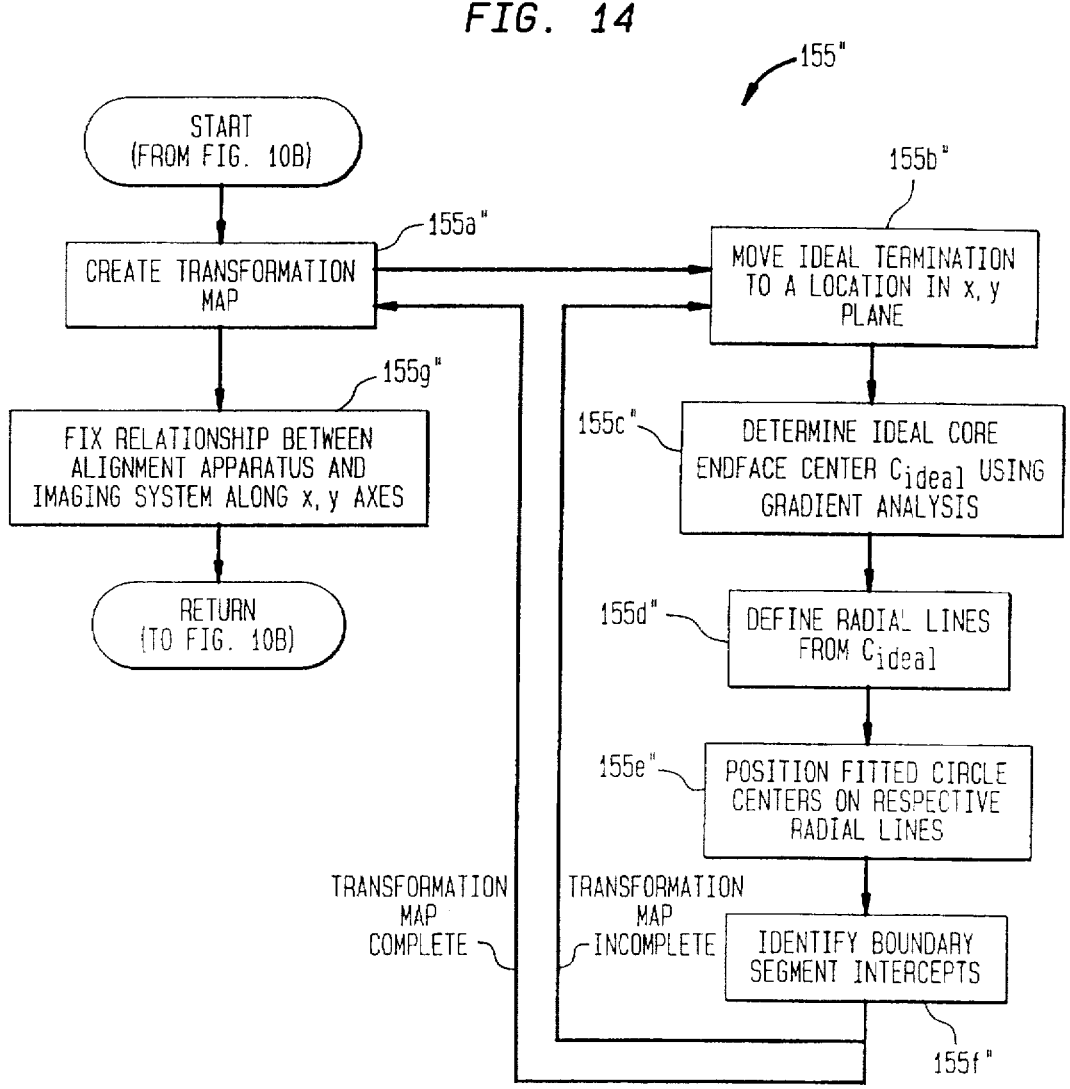
FIGS. 14 and 15 show a second embodiment (best mode) for calibration and eccentricity determination in the inspection method of FIGS. 10A and 10B; specifically.
Figure 15:
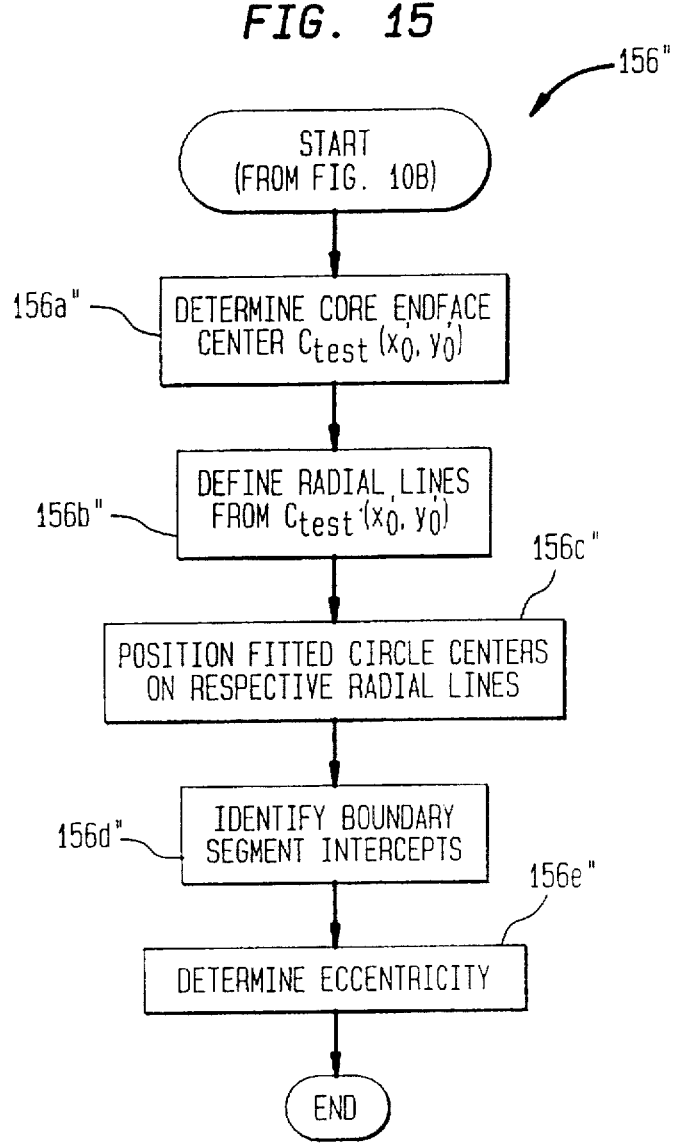

The calibration procedure of the second embodiment is shown in FIG. 14 and is denoted by reference numeral 155". Initially, at this point in the inspection method 140, an ideal termination 21 is exposed to the imaging system 32 and is in focus (fixed with respect to the alignment apparatus 110 along z axis).

As delineated in the flow chart block 155a", a transformation map is created from the ideal termination 21 and stored for future reference. The transformation map is essentially a device for comparing the characteristics of an ideal termination 21 to another termination 21 to be tested. Structurally, the transformation map can be a lookup table or a mathematical equation implemented by the inspection method 140. To create the transformation map, a series of measurements is performed with the inspection system 30 in which the termination 21 is sequentially moved to a multiplicity of x, y locations in the field of view of the imaging system 32 with an adjustment mechanism, and data pertaining to each boundary segment 125 and core endface 28' is stored for each location.

Any appropriate adjustment mechanism (not shown) can be employed for moving either the alignment apparatus or the imaging system 32 so that the termination endface 21' can be systematically moved by the user in an x, y plane to cause the core endface 28' to appear anywhere in a predefined image area in the x, y plane. For example, the adjustment mechanism could simply be a mounting bracket that permits manual movement of the alignment apparatus 110 or the imaging system 32 by the user. In the preferred embodiment, the adjustment mechanism is employed in connection with the alignment apparatus 110, and the alignment apparatus 110 can be moved along the x, y axes, while the termination endface 21' remains in focus along the z axis.

As set forth in flow chart blocks 155b"–155f", the transformation map is derived as follows. As indicated in flow chart block 155b", the ideal termination 21 is moved to a location in the x, y plane with the adjustment mechanism. The ideal core endface center $C_{ideal}(x_0, y_0)$ is identified via any suitable gradient search analysis, pursuant to flow chart block 155c". After identifying the ideal core endface center $C_{ideal}(x_0, y_0)$, radial lines are drawn outwardly from the center $C_{ideal}(x_0, y_0)$, one radial line corresponding with each boundary segment 125, in accordance with flow chart block 155d". The radial lines are preferably spaced symmetrically about the $C_{ideal}(x_0, y_0)$. Moreover, as indicated in the flow chart block 155e", the center of the fitted curve corresponding to each boundary segment 125 is positioned in virtual space on the corresponding radial line. Further, the pixel positions where the radial lines intercept the fitted curves are identified, as indicated in the flow chart block 155f", and these intercept positions are stored as well as the core position of the core endface 28' are stored for the particular termination location. A new location is selected, and the aforementioned procedure is repeated until a sufficiently complete transformation map has been constructed.

Creation of the transformation map in connection with the preferred embodiment occurs as follows. As graphically illustrated in FIG. 16, in the preferred embodiment where there are four boundary segments 125a–125d that are spaced symmetrically about the $C_{ideal}(x_0, y_0)$, radial lines 157a–157d are defined in the image 131. In fact, preferably, a single vertical line (comprising radial lines 157b, 157d) and a single horizontal line (comprising radial lines 157a, 157c) are defined so that they are perpendicular to each other and so that their intersection is positioned on the ideal core endface center $C_{ideal}(x_0, y_0)$. Then, the centers of the fitted curves corresponding to the four boundary segments 125 are positioned in virtual space so that they reside on one of the lines. Thus, the centers of curves corresponding with boundary segments 125b, 125d are positioned on the vertical line 157, and the centers of curves corresponding with boundary segments 125a, 125c are positioned on the horizontal line 158. Next, the intercept values $x_1'$, $X_3'$, $y_1'$, and $y_3'$, where the respective radial lines 157c, 157a, 157d, 157b intersect the respective boundary segment curves 125c, 125a, 125d, 125b, are identified. Finally, the intercept values $x_1'$, $X_3'$, $y_1'$, and $y_3'$ as well as the core location of the core endface 28' are stored for the particular termination location. A new location is selected, and the aforementioned procedure is repeated until a sufficiently complete transformation map has been constructed.

Once the optical system has been characterized in this manner by the transformation map, the ideal termination 21 is moved with the adjustment mechanism so that its core endface 28' appears near the center of the image space. For example, if the image space is 480×512 pixels, then the ideal core endface center $C_{ideal}(x_0, y_0)$ is positioned at the 240th pixel along the y axis and at the 256th pixel along the x axis. Then, the adjustment mechanism is stabilized and fixed at this location for future operation of the inspection system 30 so that the alignment apparatus 110 and the imaging system 32 are fixed along the x, y axes, in accordance with the flow chart block 155g".

2. Eccentricity Determination Method

The eccentricity determination method in accordance with the second embodiment is set forth in detail in FIG. 12 and is denoted by reference numeral 156". The method 156" will be described with reference to the graph constructed by phantom lines in FIG. 16. In general, with the method 156", a test termination 21 of unknown eccentricity is measured using the transformation map that was constructed using the calibration method 155" and the ideal termination 21.

Figure 16:
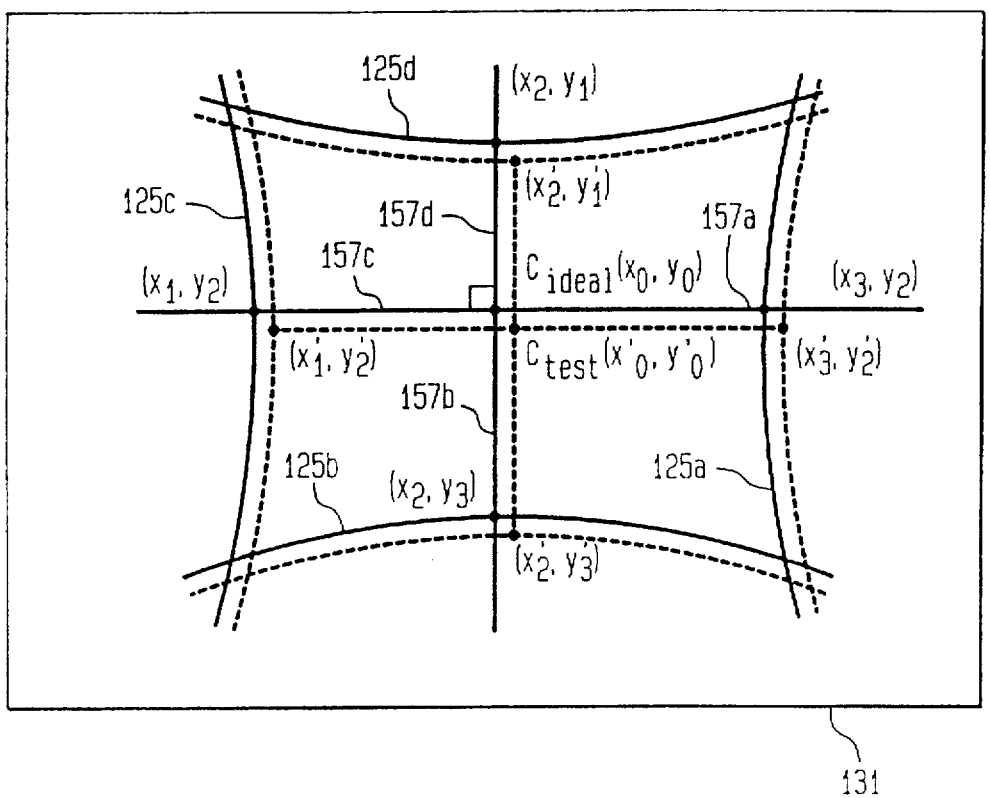
FIG. 16 is a schematic view of the combined image (best mode) of FIG. 9C showing how a theoretical ideal center $C_{ideal}$ of an ideal termination is used to create a transformation map and how an eccentricity is determined from the core endface center $C_{test}$ of a test termination based upon the transformation map, in accordance with the second embodiment for calibration and eccentricity determination of FIGS. 14 and 15.

The core endface center $C_{test}(x_0', y_0')$ is identified via any suitable gradient search analysis, pursuant to flow chart block 156a" and as graphically shown in FIG. 16. After identifying the ideal core endface center $C_{test}(x_0', y_0')$, radial lines are drawn outwardly from the center $C_{test}(x_0', y_0')$, one radial line corresponding with each boundary segment 125, in accordance with flow chart block 156b". The radial lines are preferably spaced symmetrically about the $C_{test}(x_0'y_0')$. Moreover, as indicated in the flow chart block 156c", the center of the fitted curve corresponding to each boundary segment 125 is positioned in virtual space on the corresponding radial line. Further, the pixel positions where the radial lines intercept the fitted curves are identified, as indicated in the flow chart block 156d". The intercept positions are indicated as $(x_1', y_2')$, $(x_2', y_1')$, $(x_3', y_2')$, and $x_2'$, $y_3'$) in FIG. 16. However, preferably, only the coordinates $x_1'$, $x_3'$, $y_1'$, and $y_3'$ are identified, as these are sufficient to compute the eccentricity.

Next, in accordance with the flow chart block 156e", the eccentricity is computed. First, the quantities $\epsilon x$ and $\epsilon y$ are calculated from the formulas listed below:

$$\epsilon_x = \left( x_1 + \frac{x_3 - x_1}{2} \right) - \left( x_1' + \frac{x_3' - x_1'}{2} \right) \text{ at the } y_2 \text{ level}$$

$$\epsilon_y = \left( y_1 + \frac{y_3 - y_1}{2} \right) - \left( y_1' + \frac{y_3' - y_1'}{2} \right) \text{ at the } x_2 \text{ level}$$

where $x_1'$, $x_3'$, $y_1'$, and $y_3'$ are the positions of the intercepts of a zero eccentricity termination 21 whose core endface 28' is measured at a point coincident with the current location of the core endface 28' of the test termination 21. Furthermore, the eccentricity is determined by the following equation:

$$ecc = \sqrt{\epsilon_x^2 + \epsilon_y^2}.$$

The eccentricity calculated in the second embodiment is much more accurate than that computed in the first embodiment because the second embodiment corrects for nonlinearities in the imaging system 32 (FIG. 2) and optimally relates the position of the boundary segments 125 to the core endface 28'.

VII. BALANCED FOCUS METHOD

A balanced focus method 160 is illustrated in FIGS. 12A–12C. The balanced focus method 160 is applicable to an inspection system 30 (FIG. 2) that employs more than one boundary segment imager 36 and is implemented in the best mode of the invention. Essentially, the balanced focus method 160 is an optimization technique for increasing the accuracy of the computation and location of the boundary segments 125 (FIG. 8, 9A–9D).

Generally, locating the position of multiple segments 125 using the machine vision system 134 (FIG. 2) is most accurate when the segments 125 are in sharp focus, i.e., the gradient between the segment 125 and the background is maximized. Small differences in the optical focal length of the several boundary segment imagers 36 can exist. These differences in general mean that portions of the object under test will achieve maximal gradient at different extensions of the FAM 39. The balanced focus method 160 overcomes the foregoing problem.

The balanced focus method 160 is implemented by the machine vision system 34 (FIG. 2–6) during the step in the inspection method 140 (FIGS. 10A–10B) denoted in flow chart block 147 (FIG. 10A). As described previously, in the step indicated at the flow chart block 147, localized gradient searches are performed in order to identify each boundary segment 125.

Figure 17B:
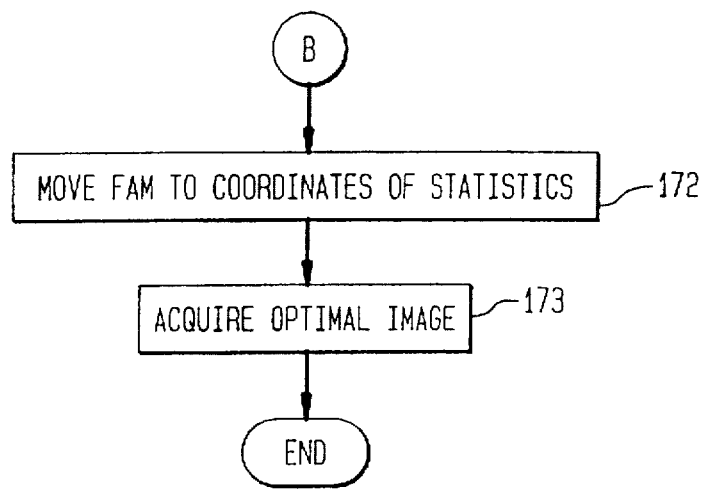
Figure 17C:
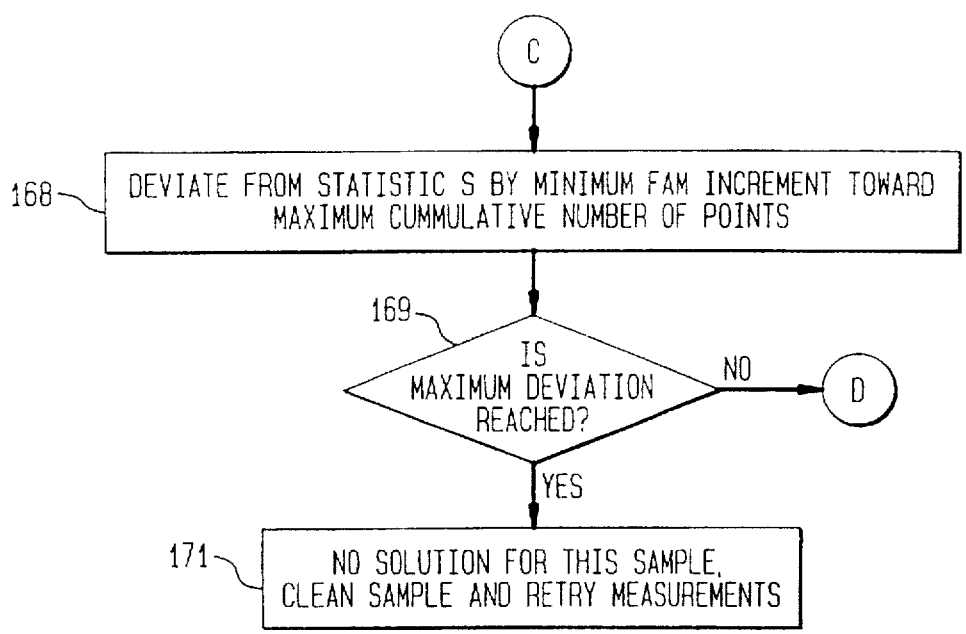

Pursuant to the balanced focus method 160, as denoted in the flow chart block 161 of FIG. 17A, the FAM 39 is initially adjusted so that the focus of any of the boundary segment imagers 36 is before the focus plane of any of the boundary segments 125.

Next, a search area 135 is defined for each boundary segment 125 based upon the actual location of the core endface 28', as indicated in the flow chart block 162. The search areas are preferably spaced symmetrically about the core endface 28'.

Pursuant to the flow chart block 163, a series of combined images 136 are generated and stored by moving the imaging system 32 incrementally along a z axis aligned with the longitudinal axis of the termination 21. During the acquisition of the images 136, the optimal focus point for each search area 135 as well as the cumulative optimal focus point for the imaging system 32 are passed. After retrieving each combined image 136, gradient searches are performed in each search area 135 to identify the pixel exhibiting the maximum gradient for each scan line.

With respect to the gradient searches in each search area 135, pixels having a maximum gradient in a scan line are saved, provided that they meet a minimum threshold, as delineated in the flow chart block 164. In the preferred embodiment, the minimum threshold $T_{min}=P_{min}+0.3$ ($P_{max}-P_{min}$), where $P_{max}$ is the grey scale value (0–255) of the lightest pixel and where $P_{min}$ is the grey scale value of the darkest pixel. The $P_{max}$ and $P_{min}$ can be determined using any suitable process, for example, a histogram. Furthermore, the number of pixels that have a maximum gradient in a scan line and that meet the minimum threshold are summed for each search area 135. In the preferred embodiment, there are four search areas 135, and hence, four sums a, b, c, d, of pixels result from the foregoing process.

In accordance with the flow chart block 165, a search is performed through each of the sums to identify an optimal focus position for the imaging system 32 along the z axis, as dictated by the FAM 39, for each individual search area 135. The optimal focus position corresponds to the position where the highest number of acceptable pixels (meeting threshold requirements) for the particular search area 135 is achieved.

Next, as indicated in the flow chart block 166, a statistic S is computed by summing the absolute value of the differences between pairings of all combinations of the pixel sums for each search area. In the preferred embodiment, there are four segments 125 and four pixel sums a, b, c, d, and thus, the statistic $S=|a-b|+|a-c|+|a-d|+|b-c|+|b-d|+|c-d|$.

Figure 18:
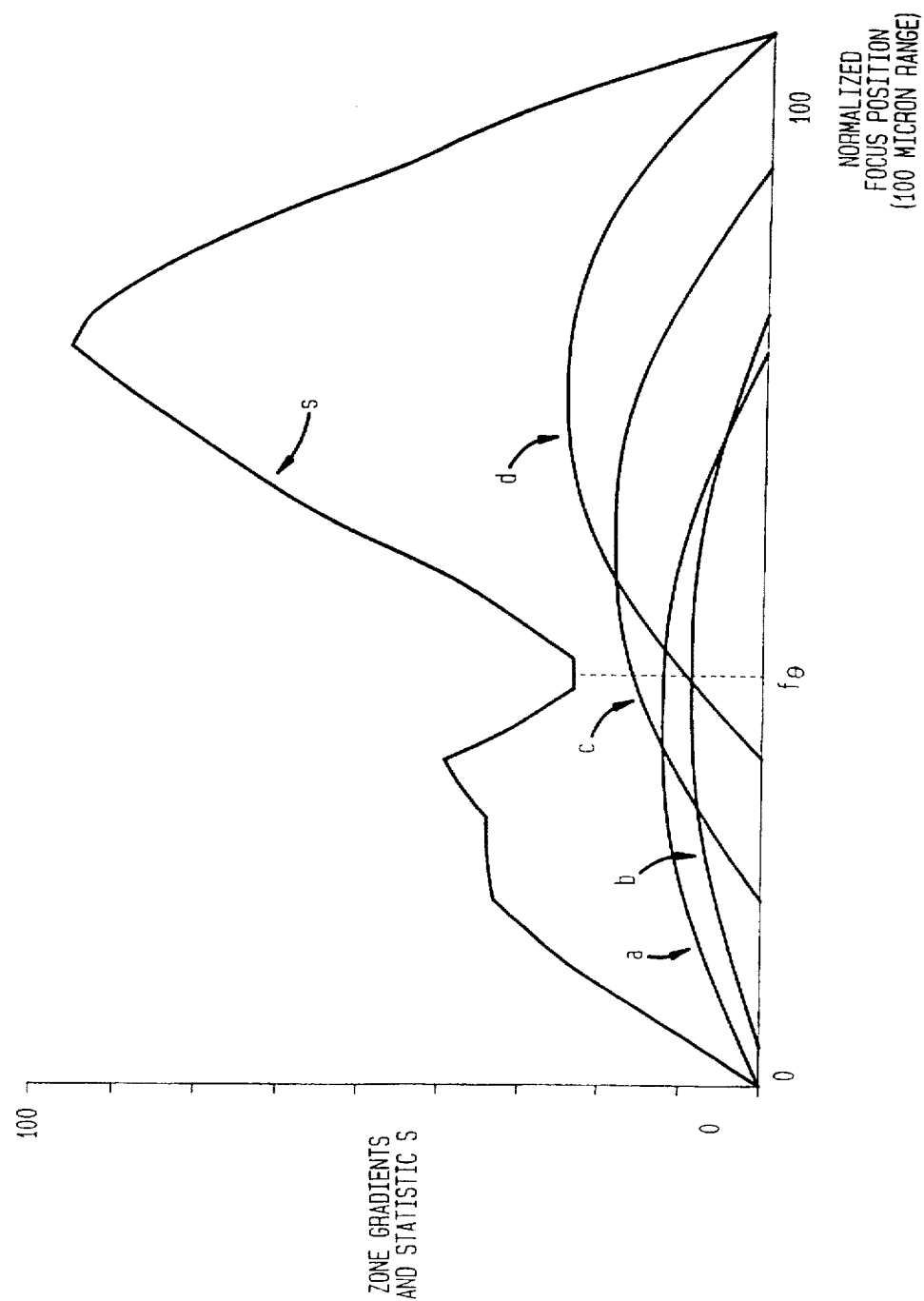
FIG. 18 is a graph showing a statistic S that is utilized in the balanced focus method of FIGS. 17A and 17B.

The statistic S exhibits the graph as shown in FIG. 18. In accordance with the flow chart block 167, the statistic S is analyzed and the focus position $f_0$ where the slope of the statistic S is at a minimum is identified. Next, a determination is made as to whether each search area 135 contains enough pixels when the slope of the statistic S is minimized. This ensures a reliable fit. Moreover, the threshold is an arbitrary number, preferably based upon empirical data.

If the answer to the foregoing inquiry is in the negative, then the balanced focus method 160 deviates from the statistic S by a minimum FAM increment toward the maximum cumulative number of pixels, in accordance with the flow chart block 168. A determination is made as to whether a maximum deviation has been reached based upon the number of FAM increments moved, as indicated in the flow chart block 169. If the maximum deviation has not been reached, then the method 160 returns to the step indicator in the flow chart block 167 to determine whether there are enough gradient points. In the event that the maximum deviation has been reached, then the method 160 terminates, and an appropriate message can be forwarded via the output device 46 (FIG. 2) to the user, such as "No solution for this sample. Clean sample and retry the measurements." The foregoing is indicated in the flow chart block 171.

When it is determined that there are enough gradient points based upon the statistic S, as inquired in the flow chart block 167, the method 160 then moves the FAM 39 to the z coordinate of the optimal minimum statistic S, as delineated in the flow chart block 172.

After the FAM 39 has been moved to the z coordinate, the optimal image 136 is acquired, as indicated in the flow chart block 173, for further analysis in accordance with the further steps of the inspection method 140 (FIGS. 10A–10B).

It will be obvious to those skilled in the art that many modifications and variations may be made to the embodiments as described without substantially departing from the spirit and scope of the present invention. It is intended that all such modifications and variations be included herein within the scope of the present invention, as is set forth in the appended claims.

Wherefore, the following is claimed:

1. A balanced focus system for achieving optimal focus of different areas of an object that are concurrently imaged and then combined to form a combined image, comprising:

an optical system for concurrently capturing respective area images of said different areas of said object;

a focus adjustment mechanism adapted to change a focus of said optical system relative to said object;

a camera adapted to receive said area images and combine said area images to form said combined image so that said area images appear as portions of said combined image;

a machine vision system configured to control said focus adjustment mechanism and to receive from said camera and store a series of combined images, each of said combined images of said series being captured during a different focus of said optical system; and a balance focus means associated with said machine vision system for performing a gradient analysis on each of said respective area images and for determining an optimal focus for said optical system based upon said series of said combined images.

2. A balanced focus system for achieving optimal focus of different areas of an object that are concurrently imaged and then combined to form a combined image, comprising:

and optical system for concurrently capturing respective area images of said different areas of said object;

a focus adjustment mechanism adapted to change a focus of said optical system relative to said object;

a camera adapted to receive said area images and combine said area images to form said combined image so that said area images appear as portions of said combined image;

a machine vision system configured to control said focus adjustment mechanism and to receive from said camera and store a series of combined images, each of said combined images of said series being captured during a different focus of said optical system;

a balanced focus means associated with said machine vision system for determining an optimal focus for said optical system based upon said series of said combined images;

means for defining search areas in each of said combined images that encompass and correspond with said area images;

means for identifying pixel locations in each of said search areas that exhibit a maximum gradient and that exceed a predetermined threshold;

means for determining a number of pixel locations that are identified for each of said search areas to produce pixel sums corresponding to said search areas respectively;

means for computing a statistic for each of said sampling locations by mathematically combining said pixel sums; and means for determining an optimal sampling location for said optical system based upon a local minimum of said statistic.

3. The system of claim 2, wherein said means for computing said statistic is configured to add together absolute values of differences between each pairing of said sums.

4. The system of claim 2, wherein said different areas are four in number and wherein said statistic is determined by said means for computing by the following equation: $S=|a-b|+|a-c|+|a-d|+|b-c|+|b-d|+|c-d|$, where said statistic is denoted by S and said pixel sums are denoted by a, b, c, and d.

5. A balanced focus system for achieving optimal focus of different area of an object that are concurrently imaged and then combined to form a combined image, the object being imaged by an optical system having an objective, comprising:

(a) means for generating a series of combined images by the following steps:

(1) means for moving said objective incrementally along an axis relative to said object;

(2) means for concurrently capturing respective images of said different areas of said object with said optical system when said objective resides at various sampling locations along said axis; and (3) means for combining said respective images corresponding with particular sampling locations of said objective so that said respective images appear as portions of each of said combined images; and (b) means for determining an optimal focus position for said optical system along said axis based upon said series of said combined images; and wherein said determining means further includes a means for performing a gradient analysis on each of said respective images.

6. A balanced focus system for achieving optimal focus of different areas of an object that are concurrently imaged and then combined to form a combined image, the object being imaged by an optical system having an objective, comprising:

(a) means for generating a series of combined images by the following steps:
  (1) means for moving said objective incrementally along an axis relative to said object;
  (2) means for concurrently capturing respective images of said different areas of said object with said optical system when said objective resides at various sampling locations along said axis;
  (3) means for combining said respective images corresponding with particular sampling locations of said objective so that said respective images appear as portions of each of said combined images;

(b) means for determining an optimal focus position for said optical system along said axis based upon said series of said combined images according to the following steps;
  (1) means for defining search areas in each of said combined images that encompass and correspond with said image areas;
  (2) means for identifying pixel locations in each of said search areas that exhibit a maximum gradient and that exceed a predetermined threshold;
  (3) means for determining a number of pixel locations that are identified for each of said search areas to produce pixel sums corresponding to said search areas respectively;
  (4) means for computing a statistic for each of said sampling locations by mathematically combining said pixel sums; and
  (5) means for determining said optimal focus position based upon a local minimum of said statistic.

7. The system of claim 6, wherein said means for computing said statistic includes a means for adding together absolute values of differences between each pairing of said sums.

8. The system of claim 6, wherein said different areas are four in number and wherein said means for computing said statistic includes a means for calculating the following equation: $S=|a-b|+|a-c|+|a-d|+|b-c|+|b-d|+|c-d|$, where said statistic is denoted by S and said pixel sums are denoted by a, b, c, and d.

9. A balanced focus method for achieving optimal focus of different areas of an object that are concurrently imaged and then combined to form a combined images the object being imaged by an optical system having an objective, comprising the steps of:

(a) generating a series of combined images by the following steps:
  (1) moving said objective incrementally along an axis relative to said object;
  (2) capturing concurrently respective images of said different areas of said object with said optical system when said objective resides at various sampling locations along said axis; and
  (3) combining said respective images corresponding with particular sampling locations of said objective so that said respective images appear as portions of each of said combined images;

(b) determining an optimal focus position for said optical system along said axis based upon said series combined images; and wherein said determining step includes the step of performing a gradient analysis on each of said respective images.

10. A balanced focus method for achieving optimal focus of different areas of an object that are concurrently imaged and then combined to form a combined image, the object being imaged by an optical system having an objective, comprising the steps of:

(a) generating a series of combined images by the following steps:
  (1) moving said objective incrementally along an axis relative to said object;
  (2) capturing concurrently respective images of said different areas of said object with said optical system when said objective resides at various sampling locations along said axis;
  (3) combing said respective images corresponding with particular sampling locations of said objective so that said respective images appear as portions of each of said combined images;

(b) determining an optimal focus position for said optical system along said axis based upon said series of said combined images according to the following steps;
  (1) defining search areas in each of said combined images that encompass and correspond with said image areas;
  (2) identifying pixel locations in each of said search areas that exhibit a maximum gradient and that exceed a predetermined threshold;
  (3) determining a number of pixel locations that are identified for each of said search areas to produce pixel sums corresponding to said search areas respectively;
  (4) computing a statistic for each of said sampling locations by mathematically combining said pixel sums; and
  (5) determining an optimal sampling location for said objective based upon a local minimum of said statistic.

11. The method of claim 10, wherein said statistic is determined in step (b)(4) by adding together absolute values of differences between each pairing of said sums.

12. The method of claim 10, wherein said different areas are four in number and wherein said statistic is determined in step (e) by the following equation: $S=|a-b|+|a-c|+|a-d|+|b-c|+|b-d|+|c-d|$, where said statistic is denoted by S and said pixel sums are denoted by a, b, c, and d.

* * * * *